US012619569B2

(12) United States Patent
Wu et al.

(10) Patent No.: US 12,619,569 B2
(45) Date of Patent: May 5, 2026

(54) IO PROCESSING METHOD AND APPARATUS

(71) Applicant: HUAWEI TECHNOLOGIES CO., LTD., Shenzhen (CN)

(72) Inventors: Bin Wu, Hangzhou (CN); Jinsong Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/770,598

(22) Filed: Jul. 11, 2024

(65) Prior Publication Data

US 2025/0013594 A1     Jan. 9, 2025

Related U.S. Application Data

(63) Continuation of application No. 17/564,064, filed on Dec. 28, 2021, now Pat. No. 12,061,566, which is a
(Continued)

(30) Foreign Application Priority Data

Jun. 29, 2019     (CN) .......................... 201910582537.6

(51) Int. Cl.
*G06F 13/42* (2006.01)
*G06F 9/455* (2018.01)
(Continued)

(52) U.S. Cl.
CPC ...... *G06F 13/4221* (2013.01); *G06F 9/45558* (2013.01); *G06F 13/24* (2013.01);
(Continued)

(58) Field of Classification Search
CPC ...... G06F 9/45558; G06F 13/24; G06F 13/28; G06F 13/4221; G06F 2009/45579; G06F 2009/45583
See application file for complete search history.

(56) References Cited

U.S. PATENT DOCUMENTS 9,933,957 B1     4/2018   Cohen et al.
10,013,283 B1    7/2018   Connolly et al.
(Continued)

FOREIGN PATENT DOCUMENTS

CN       106569874  A      4/2017
CN       106648832  A      5/2017
WO       2019061014 A1     4/2019

OTHER PUBLICATIONS

[No Author Listed] [online], "TCP offload engine-Wikipedia," Feb. 19, 2019, retrieved on Jun. 12, 2024, retrieved from URL<https://en.wikipedia.org/w/index.php?title=TCP_offload_engine&oldid=884037388>, pp. 1-5.
(Continued)

*Primary Examiner* — Eric T Oberly
(74) *Attorney, Agent, or Firm* — Fish & Richardson P.C.

(57) ABSTRACT

This application provides an IO request processing method, used in an external device. The external device includes a processor and a first hardware interface, and the first hardware interface is an interface that supports a PCIe protocol. The external device communicates with a physical host through the first hardware interface. The method includes: The processor synchronizes, through the first hardware interface, queue information in storage space of a virtual machine running on the physical host to storage space of the external device, where the queue information includes one or more input/output IO requests; and the processor sends the one or more IO requests to a storage server or a network server for processing. According to this application, all hardware resources of the physical host can be used to provide virtual machine services for users, thereby improving utilization of hardware resources of the physical host.

20 Claims, 9 Drawing Sheets

Related U.S. Application Data continuation of application No. PCT/CN2020/095899, filed on Jun. 12, 2020.

(51) Int. Cl.
    *G06F 13/24*         (2006.01)
    *G06F 13/28*         (2006.01)

(52) U.S. Cl.
    CPC .... *G06F 13/28* (2013.01); *G06F 2009/45579* (2013.01); *G06F 2009/45583* (2013.01)

(56) References Cited

U.S. PATENT DOCUMENTS

| | | | | |
|---|---|---|---|---|
| 10,346,337 B1 * | 7/2019 | Johnson | ............... | G06F 13/4022 |
| 2006/0064697 A1 * | 3/2006 | Kagi | ...................... | G06F 9/5011 |
| | | | | 718/103 |
| 2007/0168641 A1 | 7/2007 | Hummel et al. | | |
| 2011/0179416 A1 * | 7/2011 | Patale | ................... | G06F 9/5033 |
| | | | | 712/E9.034 |
| 2012/0233363 A1 | 9/2012 | Gulati et al. | | |
| 2013/0160002 A1 * | 6/2013 | Graham | ............... | G06F 9/45558 |
| | | | | 718/1 |
| 2016/0234129 A1 * | 8/2016 | Konoura | ............... | H04L 47/781 |
| 2018/0260145 A1 * | 9/2018 | Margetts | ................. | G06F 13/16 |
| 2020/0174819 A1 | 6/2020 | Dong et al. | | |

OTHER PUBLICATIONS

EP Communication Pursuant to Article 94(3) EPC in European Appin No. 20835421.7, dated Jun. 21, 2024, 7 pages.
Extended European Search Report issued in European Application No. 20835421.7 on Jun. 29, 2022, 10 pages.
PCT International Search Report and Written Opinion issued in International Application No. PCT/CN2020/095899 on Sep. 16, 2020, 18 pages (with English translation).
Wikipedia, "iSCSI," Wikipedia reference, available on or before Jul. 9, 2018, retrieved on Jun. 15, 2022, retrieved from URL <https://en.wikipedia.org/wiki/ISCSI>, 10 pages.
Wikipedia, "PCI Express," Wikipedia reference, available on or before Jun. 26, 2019, retrieved on Jun. 15, 2022, retrieved from URL <https://en.wikipedia.org/wiki/PCI_Express>, 27 pages.
WIKIPEDIA.org [online], "TCP offload engine," Feb. 19, 2019, retrieved on Jun. 12, 2024, retrieved from URL<https: //en.wikipedia.org/w/index.php?title=TCP offload_engine&oldid=884037388>, 5 pages.

* cited by examiner

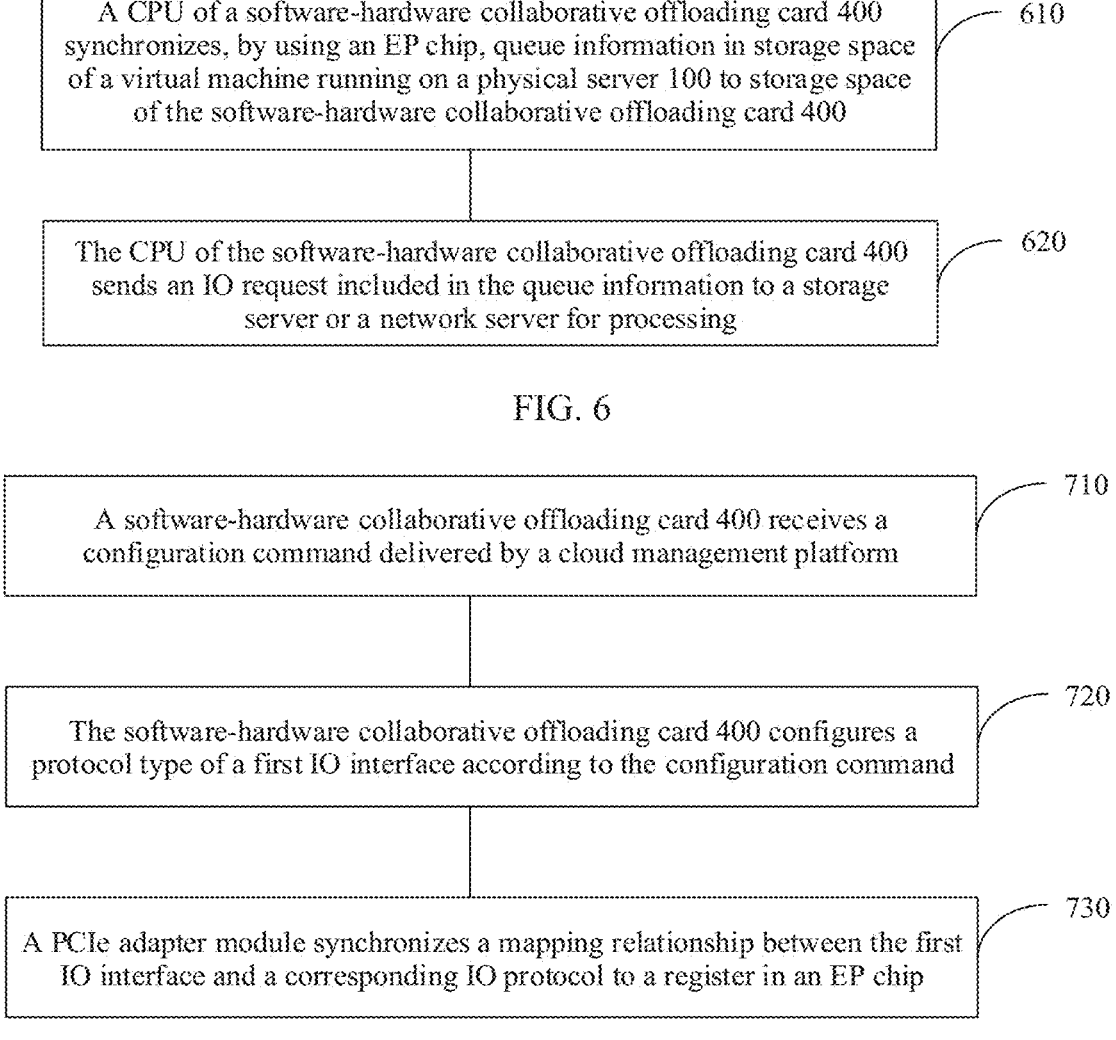

A CPU of a software-hardware collaborative offloading card 400 synchronizes, by using an EP chip, queue information in storage space of a virtual machine running on a physical server 100 to storage space of the software-hardware collaborative offloading card 400 — 610

The CPU of the software-hardware collaborative offloading card 400 sends an IO request included in the queue information to a storage server or a network server for processing — 620

FIG. 6

A software-hardware collaborative offloading card 400 receives a configuration command delivered by a cloud management platform — 710

The software-hardware collaborative offloading card 400 configures a protocol type of a first IO interface according to the configuration command — 720

A PCIe adapter module synchronizes a mapping relationship between the first IO interface and a corresponding IO protocol to a register in an EP chip — 730

FIG. 7

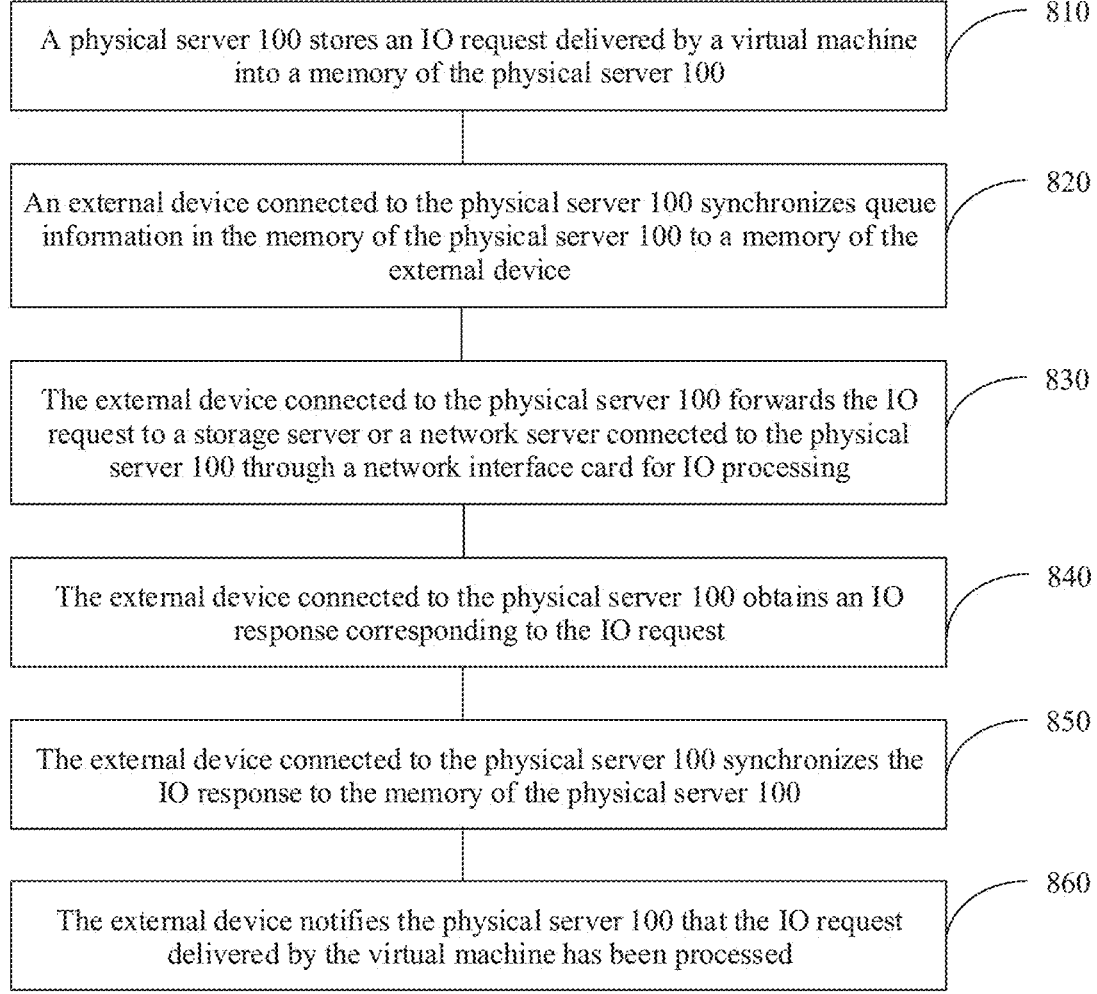

A physical server 100 stores an IO request delivered by a virtual machine into a memory of the physical server 100 — 810

An external device connected to the physical server 100 synchronizes queue information in the memory of the physical server 100 to a memory of the external device — 820

The external device connected to the physical server 100 forwards the IO request to a storage server or a network server connected to the physical server 100 through a network interface card for IO processing — 830

The external device connected to the physical server 100 obtains an IO response corresponding to the IO request — 840

The external device connected to the physical server 100 synchronizes the IO response to the memory of the physical server 100 — 850

The external device notifies the physical server 100 that the IO request delivered by the virtual machine has been processed — 860

FIG. 8

IO PROCESSING METHOD AND APPARATUS

CROSS-REFERENCE TO RELATED APPLICATIONS

This application is a continuation of U.S. patent application Ser. No. 17/564,064, filed on Dec. 28, 2021, which is a continuation of International Application No. PCT/CN2020/095899, filed on Jun. 12, 2020, which claims priority to Chinese Patent Application No. 201910582537.6, filed on Jun. 29, 2019. All of the aforementioned patent applications are hereby incorporated by reference in their entireties.

TECHNICAL FIELD

This application relates to the virtualization field, and more specifically, to an IO processing method and apparatus, and a computer-readable storage medium.

BACKGROUND

A virtualization technology is used to virtualize hardware resources of a computer device to share virtualized hardware resources to a plurality of users, so that users can conveniently and flexibly use the hardware resources of the computer device on the premise of secure isolation, and utilization of the hardware resources can be greatly improved.

A computing virtualization technology may be used to convert hardware computing resources of the computer device into virtual computing resources to share the virtual computing resources to users of a plurality of virtual machines. An IO virtualization technology is used to convert a physical storage resource and a physical network resource into a virtual storage resource and a virtual network resource, to process IO requests delivered by virtual machines running on the computer device.

During virtualization for the computer device, some hardware computing resources are required for IO virtualization, and therefore, not all hardware resources of the computer device can be shared to users. In addition, by using the IO virtualization technology, more hardware resources are required as a quantity of IO requests of virtual machines increases. Therefore, in a multi-user scenario such as a public cloud scenario, when there are a large quantity of IO requests of a plurality of users, resource contention occurs when hardware resources are insufficient. As a result, service performance greatly fluctuates and user experience deteriorates.

Therefore, currently, how to share all hardware resources of the computer device to users to avoid contention between hardware resources of the computer device becomes a problem that needs to be urgently resolved.

SUMMARY

This application provides an IO request processing method and an apparatus, so that all hardware resources of a physical host can be used to provide virtual machine services for users, to improve utilization of the hardware resources of the physical host.

According to a first aspect, an IO request processing method is provided, where the method is used in an external device. The external device includes a processor and a first hardware interface, and the first hardware interface is an interface that supports a high-speed serial computer extended bus standard PCIe protocol. The external device communicates with a physical host through the first hardware interface. The method includes: The first processor synchronizes, through the first hardware interface, queue information in storage space of a virtual machine running on the physical host to storage space of the external device. The queue information includes one or more input/output IO requests sent by the virtual machine. The processor sends the one or more IO requests to a storage server or a network server for processing.

In the foregoing technical solution, the physical host is connected to the external device, and the external device processes the IO request sent by the virtual machine running on the physical host. In this way, the IO request delivered by the virtual machine is directly transmitted to the external device of the physical host for processing, so that physical computing resource consumption resulting from IO virtualization for the physical host can be avoided, and all hardware resources of the physical host are used to provide virtual machine services for users. This improves utilization of the hardware resources of the physical host.

In a possible implementation, the method further includes: The processor receives a configuration message, where the configuration message is used to indicate to configure a protocol type of a first IO interface of the external device to a first IO protocol. A plurality of first IO interfaces are run on the first hardware interface. The first IO interface is a virtual interface of the first hardware interface. The first IO interface corresponds to the virtual machine and is adapted to process the one or more IO requests sent by the virtual machine to the first IO interface. A data type and/or a data size of the one or more IO requests in the storage space of the virtual machine are associated with the first IO protocol. The first processor configures the protocol type of the first IO interface to the first IO protocol based on the configuration message.

In the foregoing technical solution, the IO interface protocol of the external device of the physical host may be dynamically configured, so that the IO interface protocol presented by the external device to the virtual machine running on the physical host may be flexibly defined. This meets requirements of different users for a plurality of IO protocols without modifying a hardware system. In addition, this can further free the virtual machine from a constraint on an IO interface protocol of the external device, thereby improving flexibility of the virtual machine.

In another possible implementation, before the first processor synchronizes, through the first hardware interface, the queue information in the storage space of the virtual machine running on the physical host to the storage space of the external device, the method further includes: The first hardware interface receives a PCIe message sent by the physical host, where the PCIe message is used to indicate the external device that there is a to-be-processed IO request. The first hardware interface sends an interrupt request to the processor based on the PCIe message. The first processor synchronizes the queue information in the storage space of the virtual machine to the storage space of the external device through the first hardware interface based on the interrupt request.

In the foregoing technical solution, after the physical host notifies that the to-be-processed IO request is stored in the storage space of the virtual machine, the external device may synchronize the queue information in the storage space of the virtual machine to the storage space of the external device through the first hardware interface. This can reduce a quantity of PCIe messages on a PCIe link between the physical host and the external device.

In another possible implementation, the processor indicates, by using a direct memory access DMA technology, the first hardware interface to synchronize the queue information in the storage space of the virtual machine to the storage space of the external device.

In another possible implementation, the method further includes: The processor stores a quantity of IO requests processed by the first IO interface, and reloads the first IO protocol when the quantity of IO requests is 0.

In the foregoing technical solution, protocol update or upgrade is implemented without interrupting an IO service of the virtual machine.

In another possible implementation, the method further includes: The processor obtains, from the storage server or the network server, an IO response corresponding to the IO request; and stores the IO response into the storage space of the virtual machine through the first hardware interface.

In another possible implementation, the processor indicates, by using the DMA technology, the first hardware interface to store the IO response into the storage space of the virtual machine.

In another possible implementation, the method further includes: The processor stores, through the first hardware interface, IO responses corresponding to the plurality of IO requests into the storage space of the virtual machine, and sends a notification message to the physical host through the first hardware interface, where the notification message is used to notify the physical host that the plurality of IO requests have been processed.

In the foregoing technical solution, the notification message may be triggered after the IO responses corresponding to the plurality of IO requests are stored in the storage space of the virtual machine, to reduce overheads of interrupt processing of the physical host.

According to a second aspect, an IO request processing method is provided, where the method is used in a physical host. One or more virtual machines are run on the physical host. The physical host includes a processor and a second hardware interface. The second hardware interface is an interface that supports a high-speed serial computer extended bus standard PCIe protocol. The physical host communicates with an external device through the second hardware interface. The method includes: The processor stores, into storage space of the virtual machine, one or more input/output IO requests delivered by the virtual machine; and the processor synchronizes the one or more IO requests in the storage space of the virtual machine to storage space of the external device through the second hardware interface.

In another possible implementation, the method further includes: The processor sends a PCIe message to the external device through the second hardware interface, where the PCIe message is used to indicate the external device that there is a to-be-processed IO request.

In another possible implementation, the method further includes: The processor receives, through the second hardware interface, an IO response sent by the external device, where the IO response corresponds to the IO request, and the IO response is obtained by the external device from a storage server or a network server.

In another possible implementation, the method further includes: The processor receives, through the second hardware interface, a notification message sent by the external device, where the notification message is used to notify the physical host that the plurality of IO requests have been processed.

According to a third aspect, an external device is provided, where the external device includes an obtaining module, a sending module, and a first interface module.

The first interface module is adapted to communicate with a physical host, and the first interface module is an interface module that supports a high-speed serial computer extended bus standard PCIe protocol.

The obtaining module is adapted to synchronize, through the first interface module, queue information in storage space of a virtual machine running on the physical host to storage space of the external device, where the queue information includes one or more input/output IO requests sent by the virtual machine.

The sending module is adapted to send the one or more IO requests to a storage server or a network server for processing.

In the foregoing technical solution, the physical host is connected to the external device, and the external device processes the IO request sent by the virtual machine running on the physical host. In this way, the IO request delivered by the virtual machine is directly transmitted to the external device of the physical host for processing, so that physical computing resource consumption resulting from IO virtualization for the physical host can be avoided, and all hardware resources of the physical host are used to provide virtual machine services for users. This improves utilization of the hardware resources of the physical host.

In a possible implementation, the external device further includes a first receiving module, adapted to receive a configuration message, where the configuration message is used to indicate to configure a protocol type of a first IO interface of the external device to a first IO protocol. A plurality of first IO interfaces are run on the first interface module. The first IO interface is a virtual interface of the first interface module, and the first IO interface corresponds to the virtual machine and is adapted to process the one or more IO requests sent by the virtual machine to the first IO interface. A data type and/or a data size of the one or more IO requests in the storage space of the virtual machine are associated with the first IO protocol.

The external device further includes a configuration module, adapted to configure the protocol type of the first IO interface to the first IO protocol based on the configuration message.

In another possible implementation, the first interface module is further adapted to receive a PCIe message sent by the physical host, where the PCIe message is used to indicate the external device that there is a to-be-processed IO request, and send an interrupt request to the processor in the external device based on the PCIe message.

The obtaining module is specifically adapted to synchronize, through the first interface module, the queue information in the storage space of the virtual machine to the storage space of the external device based on the interrupt request.

In another possible implementation, the obtaining module is specifically adapted to indicate, by using a direct memory access DMA technology, the first interface module to synchronize the queue information in the storage space of the virtual machine to the storage space of the external device.

In another possible implementation, the external device further includes: a first storage module, adapted to store a quantity of IO requests processed by the first IO interface, and a loading module, adapted to reload the first IO protocol when the quantity of IO requests is 0.

In another possible implementation, the obtaining module is further adapted to obtain, from the storage server or the network server, an IO response corresponding to the IO request.

The external device further includes a second storage module, adapted to store the IO response into the storage space of the virtual machine through the first interface module.

In another possible implementation, the second storage module is specifically adapted to indicate, by using the DMA technology, the first interface module to store the IO response into the storage space of the virtual machine.

In another possible implementation, the first storage module is further adapted to store IO responses corresponding to the plurality of IO requests into the storage space of the virtual machine.

The first interface module is further adapted to send a notification message to the physical host, where the notification message is used to notify the physical host that the plurality of IO requests have been processed.

According to a fourth aspect a physical host is provided, where the physical host includes a storage module and a second interface module.

The second interface module is an interface that supports a high-speed serial computer extended bus standard PCIe protocol, and is adapted to communicate with an external device.

The storage module is adapted to store, into storage space of the virtual machine, one or more input/output IO requests delivered by a virtual machine running on the physical host.

The second interface module is adapted to synchronize the one or more IO requests in the storage space of the virtual machine to storage space of the external device.

In a possible implementation, the second interface module is further adapted to send a PCIe message to the external device, where the PCIe message is used to indicate the external device that there is a to-be-processed IO request.

In another possible implementation, the second interface module is further adapted to receive an IO response sent by the external device, where the IO response corresponds to the IO request, and the IO response is obtained by the external device from a storage server or a network server.

In another possible implementation, the second interface module is further adapted to receive, through the second interface module, a notification message sent by the external device, where the notification message is used to notify the physical host that the plurality of IO requests have been processed.

According to a fifth aspect, a computer system is provided, where the computer system includes a physical host and an external device. The external device is the external device according to any one of the third aspect or the possible implementations of the third aspect. The physical host is the physical host according to any one of the fourth aspect or the possible implementations of the fourth aspect.

According to a sixth aspect, an external device is provided, where the external device includes a processor, a first hardware interface, and a memory. The memory is adapted to store a computer program. The processor is adapted to invoke and run the computer program instruction from the memory to perform the following operations:

synchronizing, through the first hardware interface, queue information in storage space of a virtual machine running on the physical host to storage space of the external device, where the queue information includes one or more input/output IO requests sent by the virtual machine; and sending the one or more IO requests to a storage server or a network server for processing.

Optionally, the processor may be a general-purpose processor, and may be implemented by using hardware or software. When the processor is implemented by using the hardware, the processor may be a logic circuit, an integrated circuit, or the like. When the processor is implemented by using the software, the processor may be a general-purpose processor, and is implemented by reading software code stored in a memory. The memory may be integrated into the processor, or may be located outside the processor and exist independently.

In a possible implementation, the processor is further adapted to receive a configuration message, where the configuration message is used to indicate to configure a protocol type of a first IO interface of the external device to a first IO protocol. A plurality of first IO interfaces are run on the first hardware interface. The first IO interface is a virtual interface of the first hardware interface. The first IO interface corresponds to the virtual machine and is adapted to process the one or more IO requests sent by the virtual machine to the first IO interface. A data type and/or a data size of the one or more IO requests in the storage space of the virtual machine are associated with the first IO protocol. The processor configures the protocol type of the first IO interface to the first IO protocol based on the configuration message.

In another possible implementation, the first hardware interface is further adapted to receive a PCIe message sent by the physical host, where the PCIe message is used to indicate the external device that there is a to-be-processed IO request, and send an interrupt request to the processor.

The processor is further adapted to synchronize, through the first hardware interface, the queue information in the storage space of the virtual machine to the storage space of the external device based on the interrupt request.

In another possible implementation, the processor is specifically adapted to indicate, by using a direct memory access DMA technology, the first hardware interface to synchronize the queue information in the storage space of the virtual machine to the storage space of the external device.

In another possible implementation, the processor is further adapted to store a quantity of IO requests processed by the first IO interface, and reload the first IO protocol when the quantity of IO requests is 0.

In another possible implementation, the processor is further adapted to obtain, from the storage server or the network server, an IO response corresponding to the IO request, and store the IO response into the storage space of the virtual machine through the first hardware interface.

In another possible implementation, the processor is specifically adapted to indicate, by using the DMA technology, the first hardware interface to store the IO response into the storage space of the virtual machine.

In another possible implementation, the processor is further adapted to store, through the first hardware interface, IO responses corresponding to the plurality of IO requests into the storage space of the virtual machine, and send a notification message to the physical host through the first hardware interface. The notification message is used to notify the physical host that the plurality of IO requests have been processed.

According to a seventh aspect, a physical host is provided, including a processor, a second hardware interface, and a memory. The memory is adapted to store a computer program. The processor is adapted to invoke and run the computer program instruction from the memory to perform the following operation:

storing, into storage space of the virtual machine, one or more input/output IO requests delivered by a virtual machine running on the physical host.

The second hardware interface is adapted to synchronize the one or more IO requests in the storage space of the virtual machine to storage space of the external device.

Optionally, the processor may be a general-purpose processor, and may be implemented by using hardware or software. When the processor is implemented by using the hardware, the processor may be a logic circuit, an integrated circuit, or the like. When the processor is implemented by using the software, the processor may be a general-purpose processor, and is implemented by reading software code stored in a memory. The memory may be integrated into the processor, or may be located outside the processor and exist independently.

In a possible implementation, the second hardware interface is further adapted to send a PCIe message to the external device through the second hardware interface, where the PCIe message is used to indicate the external device that there is a to-be-processed IO request.

In another possible implementation, the second hardware interface is further adapted to receive, through the second hardware interface, an IO response sent by the external device, where the IO response corresponds to the IO request, and the IO response is obtained by the external device from a storage server or a network server.

In another possible implementation, the second hardware interface is further adapted to receive, through the second hardware interface, a notification message sent by the external device, where the notification message is used to notify the physical host that the plurality of IO requests have been processed.

According to an eighth aspect, a computer system is provided, where the computer system includes a physical host and an external device. The external device is the external device according to any one of the sixth aspect or the possible implementations of the sixth aspect. The physical host is the physical host according to any one of the seventh aspect or the possible implementations of the seventh aspect.

According to a ninth aspect, a computer program product is provided, where the computer program product includes computer program code. When the computer program code is run on a computer, the computer is enabled to perform the method according to the first aspect or the possible implementations of the first aspect.

According to a tenth aspect, a computer program product is provided, where the computer program product includes computer program code. When the computer program code is run on a computer, the computer is enabled to perform the method according to the second aspect or the possible implementations of the second aspect.

According to an eleventh aspect, a computer-readable medium is provided, where the computer-readable medium stores program code. When the computer program code is run on a computer, the computer is enabled to perform the method according to the first aspect or the possible implementations of the first aspect.

According to a twelfth aspect, a computer-readable medium is provided, where the computer-readable medium stores program code. When the computer program code is run on a computer, the computer is enabled to perform the method according to the second aspect or the possible implementations of the second aspect.

BRIEF DESCRIPTION OF DRAWINGS

FIG. 6 is a schematic flowchart of an IO request processing method according to an embodiment of this application;

FIG. 7 is a schematic flowchart of another IO request processing method according to an embodiment of this application;

FIG. 8 is a schematic flowchart of another IO request processing method according to an embodiment of this application;

DESCRIPTION OF EMBODIMENTS

The following describes technical solutions in this application with reference to the accompanying drawings.

A virtualization technology is used to virtualize hardware resources of a computer device to share virtualized hardware resources to a plurality of users, so that users can conveniently and flexibly use the hardware resources of the computer device on the premise of secure isolation, and utilization of the hardware resources can be greatly improved. The virtualization technology can be widely used in public cloud, private cloud, and cloud terminal scenarios. A public cloud (public cloud) is cloud infrastructure provided by a third party for the general public or large enterprises and can provide cloud services. A private cloud (private cloud) is a platform by integrating cloud infrastructure, software resources, and hardware resources under protection of a firewall, to share resources in data centers solely to a specific enterprise or departments of the enterprise. The private cloud may be cloud infrastructure that operates for a specific organization. The private cloud may be managed by the organization itself or a third party. A cloud server may be located inside or outside the organization. A cloud mobile phone is used as an example. The cloud mobile phone is an emulated virtual mobile phone that provides diversified and comprehensive virtual mobile phone applications and services for smartphone users by virtue of outstanding advantages of cloud computing in large-scale computing, powerful storage capabilities, and virtualization applications. The following describes in detail a hardware structure of a computer device with reference to FIG. 1.

Figure 1:
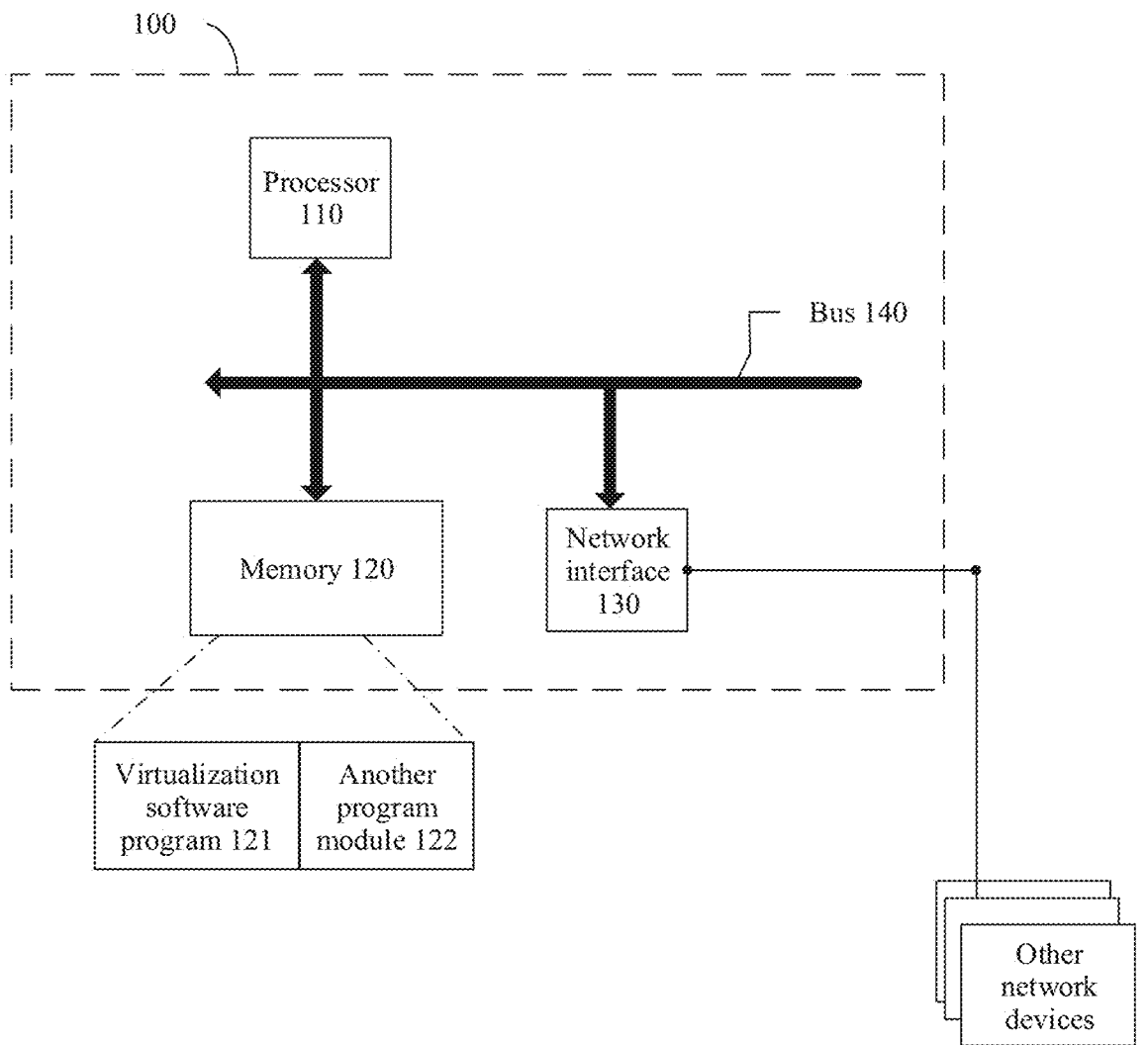
FIG. 1 is a schematic structural diagram of hardware of a computer device 100 according to an embodiment of this application.

FIG. 1 is a schematic structural diagram of hardware of a computer device 100 according to an embodiment of this application. As shown in FIG. 1, the computer device 100 includes components such as a processor 110, a memory 120, and a network interface 130 (also referred to as a network interface card, a network adapter, or the like). The processor 110 may be a single-core processor, or may be a multi-core processor. When the processor 110 is the multi-core processor, the method provided in this application may be run on one core, or may be distributively run on different cores. There may be one or more processors 110, and the plurality of processors may be of a same type or different types.

It should be understood that, the processor 110 in the embodiments of this application may be a central processing unit (central processing unit, CPU), or may be another general-purpose processor, a digital signal processor (digital signal processor, DSP), an application specific integrated circuit (application specific integrated circuit, ASIC), a field programmable gate array (field programmable gate array, FPGA) or another programmable logic device, a discrete gate or transistor logic device, a discrete hardware component, or the like. The general-purpose processor may be a microprocessor, or the processor may be any conventional processor or the like. Alternatively, the processor 110 is one or more integrated circuits.

The memory 120 may include a read-only memory and a random access memory, and provide instructions and data for the processor 110. The memory 120 may include a volatile memory and a non-volatile memory. The memory 120 may store a virtualization software program 121 and another program module 122. After the virtualization software program 121 is read and run by the processor 110, virtualization for the computer device 100 is implemented, and includes creating a host machine layer, a plurality of virtual computers, and the like. The following describes in detail a logical structural diagram of a virtualized physical host 100 with reference to FIG. 2. Details are not described herein again.

The network interface 130 is adapted to connect to other network devices, and the network interface 130 may be wirelessly or wiredly connected to the other network devices.

The foregoing components are connected through a bus 140. There may be one or more buses 140. The bus 140 is an advanced microcontroller bus architecture (advanced microcontroller bus architecture, AMBA), an industry standard architecture (industry standard architecture, ISA) bus, a micro channel architecture (micro channel architecture, MCA) bus, an extended-ISA (extended-ISA) bus, a video electronics standards association (video electronics standards association, VESA) local bus, a peripheral component interconnect (peripheral component interconnect, PCI) bus, or the like.

Figure 2:
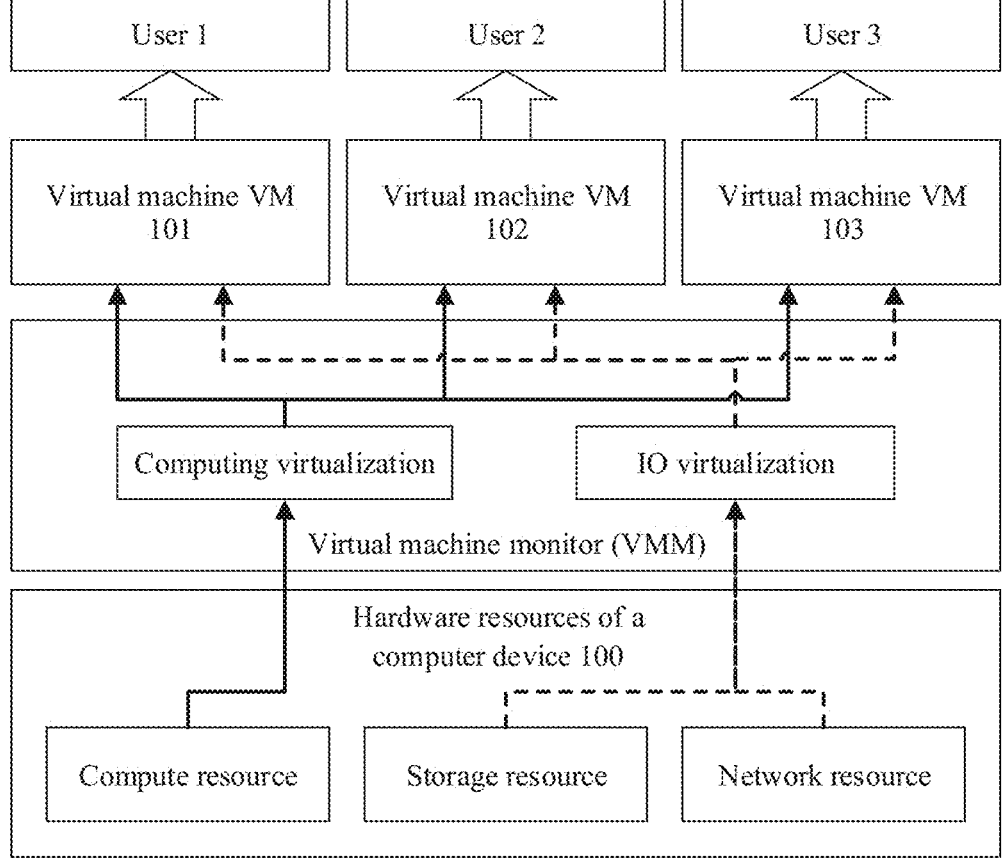
FIG. 2 is a system architectural diagram of a virtualized computer device 100 according to an embodiment of this application.

FIG. 2 is a system architectural diagram of a virtualized computer device 100 according to an embodiment of this application.

It should be understood that, in a computer, a virtualization (virtualization) technology is used to add specific software layers to a physical computer, including a host machine layer and a virtual computer layer, to "virtualize" and "isolate" hardware of the physical computer. In this way, various physical resources of the computer such as a computing resource, a network resource, and a storage resource, may be abstracted or converted to be shared to a plurality of users, so that users can conveniently and flexibly use the hardware resources of the physical computer on the premise of security isolation, and utilization of the hardware resources is greatly improved.

As shown in FIG. 2, a computing virtualization technology may be used to convert physical computing resources of the computer device 100 into virtual computing resources to share the virtual computing resources to users of a plurality of virtual machines. For example, the processor 110 shown in FIG. 1 may be converted into a virtual processor, and the memory is converted into a virtual memory to be shared to users of a VM 101, a VM 102, and a VM 103. An input output (input output, IO) virtualization technology may be used to convert a physical storage resource and a network resource into a virtual storage resource and a virtual network resource. For example, the memory 120 shown in FIG. 1 may be converted into a virtual storage resource, and other network devices connected to the network interface 130 are converted into virtual network resources to be shared to users of the VM 101, the VM 102, and the VM 103.

Figure 3:
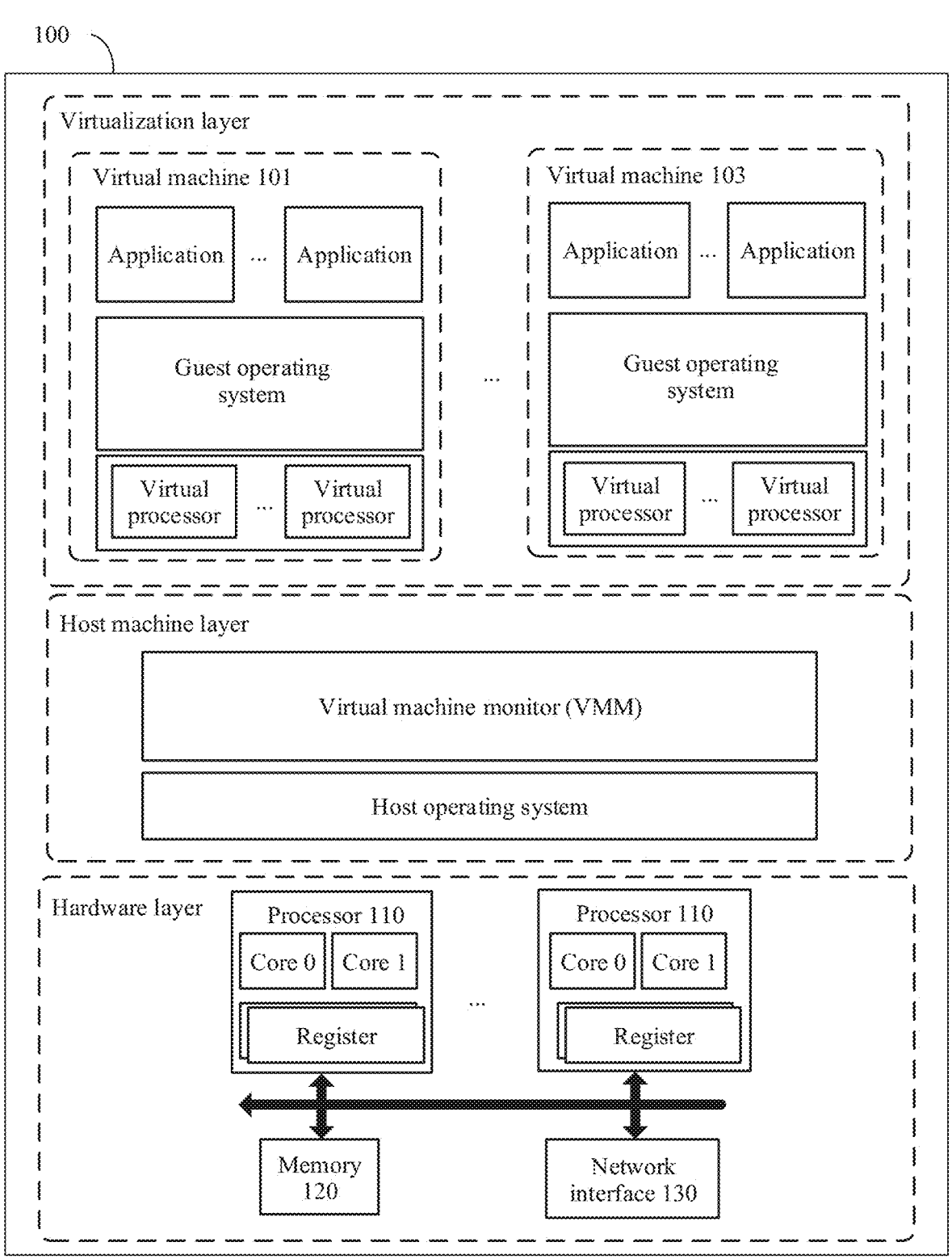
FIG. 3 is a schematic diagram of configuration of a virtualized computer device 100 according to an embodiment of this application.

Specifically, refer to FIG. 3. After the computer device 100 is virtualized, the computer device 100 may include a hardware layer, a host machine layer, and a virtualization layer. The following provides detailed descriptions.

The hardware layer is a hardware platform on which a virtualized environment is run. The hardware layer may include a plurality of types of hardware, for example, hardware such as a processor 110, a memory 120, and a network interface 130; and may further include a network interface card (network interface card, NIC), an input/output (input/output I/O) device, and the like.

It should be understood that a quantity of processors at the hardware layer is not specifically limited in this embodiment of this application. For ease of description, two processors 110 are used as an example for description in FIG. 3.

The processor 110 may include one or more physical cores (the physical core may sometimes be briefly referred to as a core in this application) and a plurality of registers. For example, the processor 110 in FIG. 3 includes two physical cores: a core 0 and a core 1. The physical core may represent a minimum processing unit in this application.

It should be noted that, in some other embodiments, the processor may include more or fewer cores, and different processors may include cores of different quantities.

The virtualization layer includes one or more virtual computers. It should be understood that a virtual computer is an umbrella term for running environments virtualized by using software on all types of virtualization devices. The virtual computer may include a virtual machine (virtual machine, VM), a container, and the like.

For example, the virtualization layer is a virtual machine VM. The virtual machine may include a virtual hardware layer, a guest operating system, and a plurality of applications. The virtual hardware layer includes virtual hardware such as a virtual memory (not shown in the figure), a virtual processor, and the like. As shown in FIG. 3, for ease of description, for example, the virtualization layer includes two virtual machines (a virtual machine 101 and a virtual machine 103). Each virtual machine contains one or more virtual processors. The virtual processor is implemented by a combination of software and hardware. Running of the virtual processor is actually implemented by a physical core by reading and running a software program. For example, a physical core reads a software program and runs the software program in a specific mode (for example, a non-root mode of x86) of hardware-assisted virtualization of the physical core, to implement a virtual processor.

It should be understood that a virtual machine VM is equivalent to a standalone computer. Therefore, an action performed by the virtual machine VM may be considered as that the action is performed by the virtual processor. However, the virtual processor is implemented by using software, and therefore the action performed by the virtual processor is actually performed by a physical processor or a physical core running on the virtual processor. In a plurality of embodiments of the present application, the foregoing representation manners are selectively used to comply with technical expression habits of a current scenario.

It should be further understood that the virtual processor may be a physical processing unit to be used by the virtual computer in a sharing or fragmentation manner in the virtualization technology. For example, the virtual processor is a virtual central processing unit (virtual central processing unit, vCPU). There may be one or more virtual processors serve one virtual machine VM. When there are a plurality of virtual processors, generally, one virtual processor is a primary virtual processor, and the other virtual processors are secondary virtual processors.

The host (host) machine layer is a management layer, to manage and allocate hardware resources at the hardware layer, present a virtual hardware platform for a virtual machine, schedule and isolate a virtual machine, and the like. In some implementations, the host machine layer includes a host operating system and a virtual monitoring apparatus, for example, a virtual machine monitor (virtual machine monitor, VMM) or a hypervisor. The virtual monitoring apparatus may be deployed inside the host operating system or outside the host operating system. The virtual hardware platform provides various hardware resources such as a virtual processor, a virtual memory, a virtual disk, a virtual network interface card, and the like for all virtual computers running on the virtual hardware platform. The virtual computer is run on the virtual hardware platform provided by the host machine layer for the virtual computer. In this application, the host machine layer is sometimes briefly referred to as a host machine.

During virtualization for the computer device, some hardware computing resources are required for IO virtualization, and therefore, not all hardware resources of the physical host can be shared to users. In addition, by using the IO virtualization technology, more hardware resources are required as a quantity of IO requests of virtual machines increases. Therefore, in a multi-user scenario such as a public cloud scenario, when there are a large quantity of IO requests of a plurality of users, resource contention occurs when hardware resources are insufficient. As a result, service performance greatly fluctuates and user experience deteriorates.

In this embodiment of this application, a virtualized computer device may be connected to an external device, a virtual machine running on the computer device may be directly connected to the external device, and the external device processes an IO request delivered by the virtual machine. In this way, the IO request delivered by the virtual machine is directly transmitted to the external device of the computer device for processing, so that physical computing resource consumption resulting from IO virtualization for the computer device is reduced, and a proportion of resources used by the computer device to provide virtual machine services for users to resources of the computer device can be increased. This improves resource utilization of a physical server.

Figure 4:
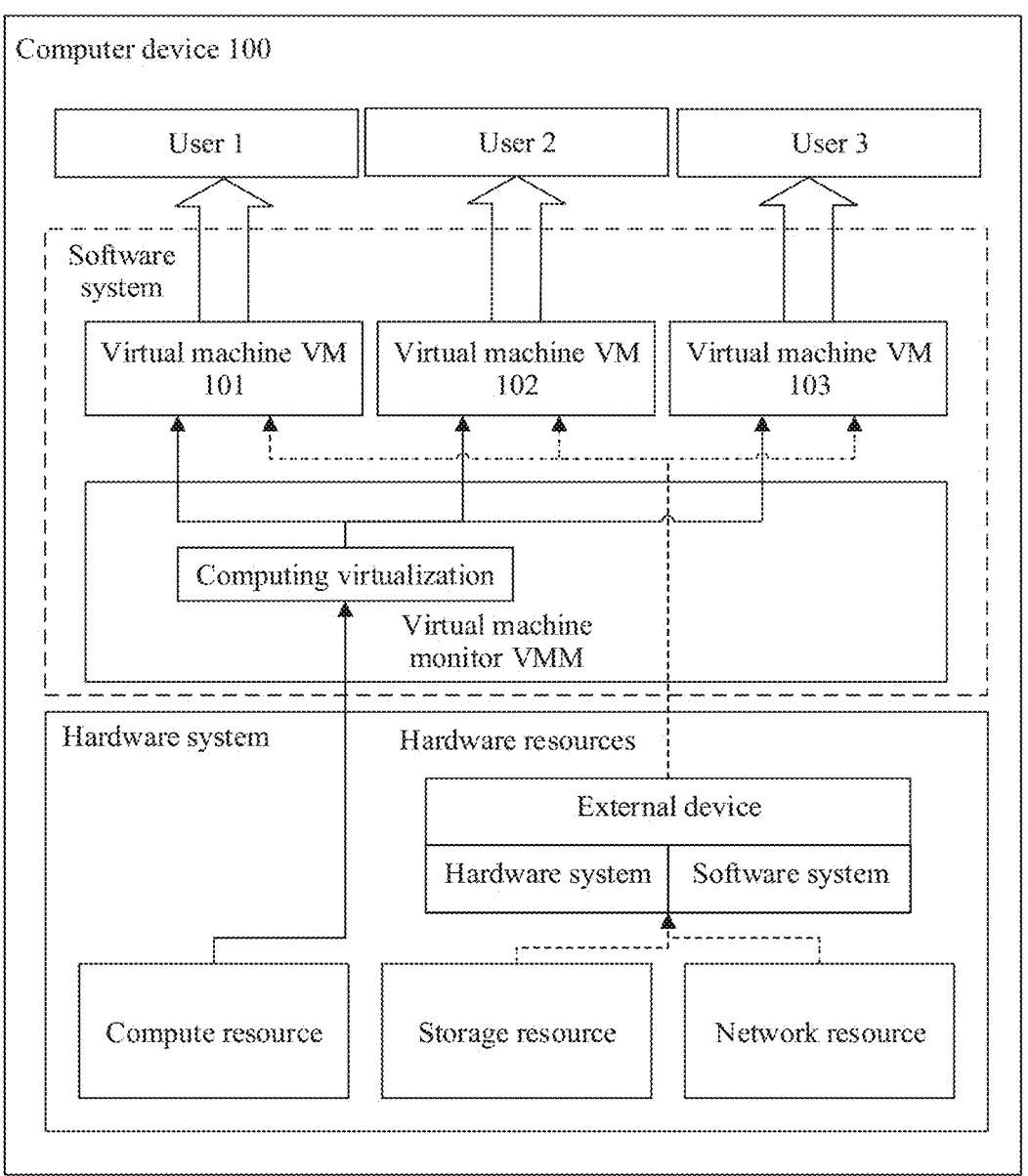
FIG. 4 is an architectural diagram in which a computer device 100 is connected to an external device according to an embodiment of this application.

In this embodiment of this application, the computer device 100 may be a physical server. Refer to FIG. 4. A software-hardware collaborative offloading card serves external device of the physical server 100. An IO request delivered by the virtual machine is directly transmitted to the software-hardware collaborative offloading card for processing. For example, the software-hardware collaborative offloading card is connected to a storage resource (a storage server) or a network resource (a network server) through a network interface card. The software-hardware collaborative offloading card may send an IO request to the storage server or the network server through the network interface card for IO processing.

Figure 5:
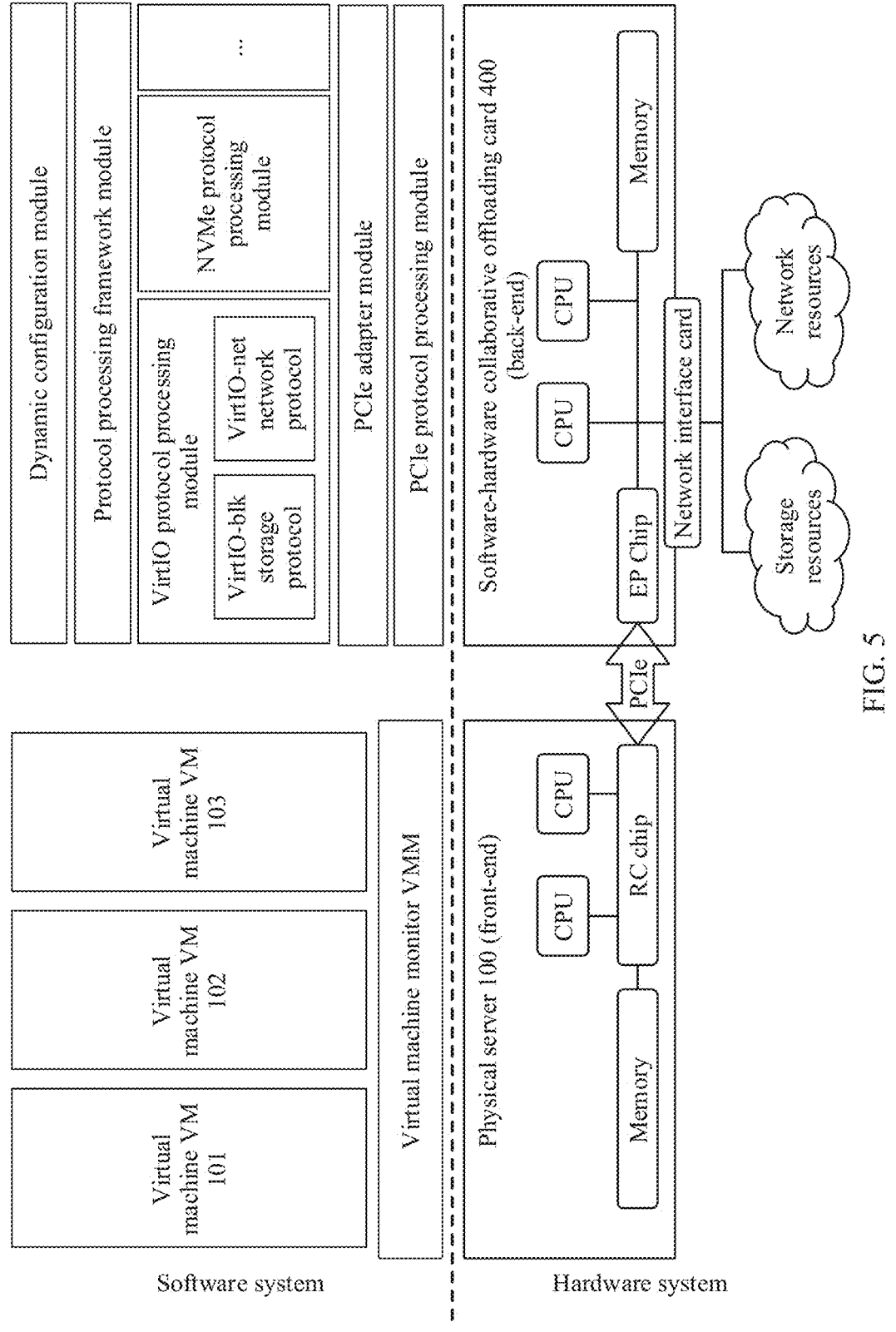
FIG. 5 is a schematic architectural diagram in which a physical server 100 is connected to a software-hardware collaborative offloading card 400 according to an embodiment of this application.

Specifically, as shown in FIG. 5, a hardware system of the physical server 100 may include a memory, at least one processor, and a hardware interface that supports a high-speed serial computer extended bus standard (peripheral component interconnect express, PCIE) protocol, for example, a root complex (root complex, RC) chip. It should be understood that, for ease of description, that the hardware system of the physical server 100 includes two CPUs is used as an example in FIG. 5. The RC chip on the physical server 100 is a hardware interface defined in a PCIe specification. The hardware interface is responsible for sending a PCIe message of the physical server 100 to an external device (for example, the software-hardware collaborative offloading card 400), or the hardware interface may be further responsible for receiving a PCIe message sent by the external device (for example, the software-hardware collaborative offloading card 400).

A hardware system of the external device (for example, the software-hardware collaborative offloading card 400) of the physical server 100 may include a memory, at least one processor, a network interface card, and a hardware interface that supports the PCIe protocol, for example, an end point (end point, EP) chip. The software-hardware collaborative offloading card 400 may be connected to a storage resource (a storage server) or a network resource (a network server) through a network interface card. It should be understood that, for ease of description, that the hardware system of the software-hardware collaborative offloading card 400 includes two CPUs in FIG. 5 is used as an example. The EP chip is a hardware interface defined in the PCIe specification, and serves as a peripheral interface of the software-hardware collaborative offloading card 400. The EP chip is responsible for sending a PCIe message to the physical server 100, or may be further responsible for receiving a PCIe message sent by the physical server 100.

Specific implementations of the RC chip and the EP chip are not limited in this embodiment of this application, provided that the RC chip and the EP chip comply with the PCIe specification.

Refer to FIG. 5. The software-hardware collaborative offloading card 400 communicates with the physical server 100 according to the PCIe protocol. Specifically, at least one processor in the software-hardware collaborative offloading card 400 may process, by running a software program stored in the memory, an IO request delivered by a virtual machine on the physical server 100. A software system of the software-hardware collaborative offloading card 400 may include five submodules: a PCIe protocol processing module, a PCIe adapter module, a protocol processing module, a protocol processing framework module, and a dynamic configuration module. The following separately describes the foregoing software modules in detail.

It should be understood that the PCIe protocol processing module and the PCIe adapter module may be in a kernel mode; and the protocol processing module, the protocol processing framework module, and the dynamic configuration module are in a user mode.

(1) PCIe Protocol Processing Module

The PCIe protocol processing module is highly related to an EP chip, and different vendors provide different EP chips. The PCIe protocol processing module is adapted to perform different write operations on registers on different EP chips provided by different vendors.

(2) PCIe Adapter Module

The PCIe adapter module mainly defines a set of abstract functional interfaces to be invoked by the upper-layer IO protocol processing module. Specific functional interfaces may include but are not limited to: a peripheral component interconnect (peripheral component interconnect, PCI) configuration space read/write interface, a PCI base address register (base address register, BAR) mapping configuration interface, a PCI message signal interrupt (message signaled interrupt, MSI)/MSI-X interrupt configuration interface, a PCI single root I/O virtualization and sharing (single root I/O virtualization and sharing, SR-IOV) capability configuration interface, a direct memory access (direct memory access, DMA) read/write interface, and an interrupt sending interface. The following describes the foregoing functional interfaces in detail.

PCI configuration space read/write interface: The interface is adapted to allocate PCI configuration space in a memory to the external interface of the software-hardware collaborative offloading card 400. A total length of the configuration space defined by a PCI bus specification is 256 bytes, where the configuration space is actually a group of consecutive registers. In this embodiment of this application, a correspondence between the external interface of the software-hardware collaborative offloading card 400 and an IO protocol of the interface may be recorded by performing a write operation on the registers in the PCI configuration space.

The PCI BAR mapping configuration interface: There are six base address registers BARs in a header of the PCI configuration space, and a type, an address, and other attributes of the PCI configuration space are recorded in the base address register BAR. In this embodiment of this application, a segment of memory space may be allocated to the base address register BAR in a memory of the software-hardware collaborative offloading card 400, and a relationship between the allocated memory and the BAR is mapped through the PCI BAR mapping configuration interface.

Interrupt sending interface: A CPU of the software-hardware collaborative offloading card 400 may send an interrupt to the front-end physical server 100 through the interrupt sending interface.

PCI MSI/MSI-X interrupt configuration interface: Compared with the MSI interrupt configuration interface, for the MSI-X interrupt configuration interface, each device can support more interrupts, and can be configured independently. In this embodiment of this application, a quantity of interrupts that can be executed by the CPU of the software-hardware collaborative offloading card 400 may be configured through the PCI MSI/MSI-X interrupt configuration interface.

DMA read/write interface: DMA is a mechanism for fast data transmission. When a memory needs to be accessed, memory information of the physical server can be directly accessed through the DMA read/write interface without accessing data from the memory by the CPU. When obtaining an IO request stored in the memory of the front-end physical server 100, the CPU of the software-hardware collaborative offloading card 400 may invoke the DMA read/write interface to perform a write operation on the register in the EP chip, so as to obtain the IO request stored in the memory of the front-end physical server 100.

(3) IO Protocol Processing Module

The IO protocol processing module is located above an underlying PCIe communication protocol, and can implement various IO protocols. The IO protocol is not specifically limited in this embodiment of this application. For example, the IO protocol may be a virtualization IO (virtualization IO, VirtIO) protocol. Correspondingly, the IO protocol processing module is a VirtIO protocol processing module. Specifically, the VirtIO protocol may include a VirtIO-blk storage protocol and a VirtIO-net network protocol. For another example, the IO protocol may be a non-volatile memory express (non-volatile memory express, NVMe) protocol. Correspondingly, the IO protocol processing module is an NVMe protocol processing module.

It should be understood that the VirtIO protocol is an IO protocol defined in the field of conventional virtualization technologies. The protocol has good ecosystem support, and released versions of current mainstream operating systems (operating system, OS) all support a front-end drive of the protocol. The NVMe protocol is an IO protocol defined by Intel for high-performance storage media.

It should be further understood that, when a protocol type of the external interface of the software-hardware collaborative offloading card 400 is configured to the VirtIO protocol, that is, an IO protocol externally presented by the software-hardware collaborative offloading card 400 is the VirtIO protocol, the software-hardware collaborative offloading card 400 may serve as a VirtIO device to process an IO request delivered by a virtual machine.

It should be noted that, in this embodiment of this application, another IO protocol may be used as an extended protocol processing module to access an upper-layer protocol processing module for protocol extension, to satisfy a user requirement that an IO interface corresponds to different IO interface protocols.

(4) Protocol Processing Framework Module

The module, serving as a top-level module of a system, concurrently processes, by using a multi-thread method, IO requests delivered by a front-end system; and sends a processed request to the front-end system. Specifically, an IO response carrying an IO operation result may be fed back to the front-end system. The protocol processing framework module may select, based on current load statuses of plurality of CPUs, a CPU with smallest load to process the IO request delivered by a virtual machine in the front-end system.

(5) Dynamic Configuration Module

The module, serving as an external management interface of the system, can configure the software-hardware collaborative offloading card 400. For example, in an initialization phase, an IO protocol type corresponding to one or more IO interfaces of the software-hardware collaborative offloading card 400 may be configured.

With reference to technical solutions in FIG. 6, the following describes in detail an implementation process in which the software-hardware collaborative offloading card 400 processes an IO request delivered by a virtual machine on the physical server 100.

FIG. 6 is a schematic flowchart of an IO request processing method according to an embodiment of this application. As shown in FIG. 6, the method may include steps 610 and 620. The following separately describes steps 610 and 620 in detail.

Step 610: A CPU of the software-hardware collaborative offloading card 400 synchronizes, by using an EP chip, queue information in storage space of a virtual machine running on the physical server 100 to storage space of the software-hardware collaborative offloading card 400.

It should be understood that, in this embodiment of this application, the queue information in the storage space of the virtual machine may include one or more IO requests, and the IO request is one or more IO requests delivered by the virtual machine on the physical server 100.

For example, the storage space of the virtual machine may be a memory of the virtual machine, and the storage space of the software-hardware collaborative offloading card 400 may be a memory of the software-hardware collaborative offloading card 400.

The software-hardware collaborative offloading card 400 synchronizes the queue information in the storage space of the virtual machine in a plurality of specific implementations. This is not specifically limited in this embodiment of this application. For example, the software-hardware collaborative offloading card 400 may synchronize queue information in the storage space of the virtual machine to the storage space of the software-hardware collaborative offloading card 400 in a polling manner. For example, the CPU of the software-hardware collaborative offloading card 400 may synchronize the queue information in the storage space of the virtual machine to the storage space of the software-hardware collaborative offloading card 400 by performing a write operation on a register included in the EP chip. For another example, after the EP chip sends an interrupt request to the CPU of the software-hardware collaborative offloading card 400, the CPU of the software-hardware collaborative offloading card 400 may synchronize the queue information in the storage space of the virtual machine to the storage space of the software-hardware collaborative offloading card 400 by performing a write operation on a register included in the EP chip.

It may be understood that the storage space of the virtual machine is a part of the storage space of the physical server 100.

Step 620: The CPU of the software-hardware collaborative offloading card 400 sends the IO request included in the queue information to a storage server or a network server for processing.

Optionally, in some embodiments, before the CPU of the software-hardware collaborative offloading card 400 synchronizes the queue information in the storage space of the virtual machine to the storage space of the software-hardware collaborative offloading card 400 by using the EP chip, the CPU of the software-hardware collaborative offloading card 400 may further receive a configuration message, where the configuration message is used to indicate to configure a protocol type of a first IO interface of the software-hardware collaborative offloading card 400 to a first IO protocol.

With reference to FIG. 7, the following describes in detail a protocol configuration method of an IO interface of the software-hardware collaborative offloading card 400. As shown in FIG. 7, the method includes steps 710 to 730. The following separately describes steps 710 to 730 in detail.

Step 710: The software-hardware collaborative offloading card 400 receives a configuration command delivered by a cloud management platform.

The cloud management platform may deliver the protocol configuration command to a dynamic configuration module in the software-hardware collaborative offloading card 400 based on an IO protocol expected to be presented to users, or the cloud management platform may deliver the protocol configuration command to the software-hardware collaborative offloading card 400 based on requirements of users. For example, the configuration command indicates to configure a protocol type of a first IO interface to a VirtIO-blk protocol.

It should be understood that a plurality of IO interfaces may be configured for the software-hardware collaborative offloading card 400. One or more IO protocols may be configured for one IO interface according to the configuration command. Different IO interface protocols indicate that the software-hardware collaborative offloading card 400 provides different functions externally. For example, when a protocol type of the IO interface of the software-hardware collaborative offloading card 400 is configured to the VirtIO-blk protocol, the software-hardware collaborative offloading card 400 may serve as a VirtIO device to provide a VirtIO-blk storage function for an IO request delivered by a virtual machine.

Step 720: The software-hardware collaborative offloading card 400 configures the protocol type of the first IO interface according to the configuration command.

Optionally, after receiving the configuration command delivered by the cloud management platform, the software-hardware collaborative offloading card 400 may notify, based on an IO interface and an IO protocol type that are included in the configuration command, a protocol processing framework module to determine whether the protocol is supported. If the protocol is supported, the protocol processing framework module records a correspondence between the first IO interface and the IO protocol. If the protocol is not supported, the dynamic configuration module in the software-hardware collaborative offloading card 400 returns a configuration failure externally.

Specifically, the dynamic configuration module in the software-hardware collaborative offloading card 400 determines that the protocol in the configuration command can be supported, and may allocate PCI configuration space and BAR space to the first IO interface.

For example, the configuration command indicates the dynamic configuration module to configure the protocol type of the first IO interface to the VirtIO-blk protocol. The dynamic configuration module may invoke a PCIe configuration space read/write interface of a PCIe adapter module to allocate the PCI configuration space object, configure an identification (identification, ID) of a vendor register in the PCI configuration space to 0x1af4, and configure an ID of a device register in the PCI configuration space to 0x1001. The dynamic configuration module may further allocate a memory of a specific size as the VirtIO BAR space, and establish a mapping relationship between the memory and a VirtIO BAR by invoking a PCI BAR mapping configuration interface of the adapter module. In other words, all subsequent operations performed by a front end on the BAR are mapped to the memory by an EP chip in the back-end software-hardware collaborative offloading card 400.

It should be understood that the PCI configuration space is a set of registers. Configuring the vendor_ID in the PCI configuration space to 0x1af4 and configuring the device_ID to 0x1001 may be understood as configuring the protocol type of the first IO interface to the VirtIO-blk protocol.

Step 730: The PCIe adapter module synchronizes a mapping relationship between the first IO interface and a corresponding IO protocol to a register in the EP chip.

The EP chip may include a plurality of physical registers, and the PCIe adapter module may invoke a PCIe protocol processing module to synchronously write the mapping relationship between the first IO interface and the corresponding IO protocol into the physical register in the EP chip. In this way, a front-end physical server 100 may determine the IO protocol type of the first IO interface by scanning the mapping relationship between the first IO interface and the corresponding IO protocol that is recorded in the physical register in the EP chip.

In this embodiment of this application, the IO interface protocol of the software-hardware collaborative offloading card 400 may be dynamically configured, so that the IO interface protocol externally presented by the software-hardware collaborative offloading card 400 can be flexibly defined. This meets requirements of different users for a plurality of IO protocols without modifying a hardware system In addition, this can further free the virtual machine from a constraint on an IO protocol corresponding to an IO interface, thereby improving flexibility of the virtual machine.

With reference to FIG. 8, the following describes in detail an implementation process in which the software-hardware collaborative offloading card 400 processes an IO request delivered by a virtual machine on the physical server 100. As shown in FIG. 8, a processing procedure of an IO request may include steps 810 to 860. The following describes steps 810 to 860 in detail.

For ease of description, the following uses an example in which storage space of the software-hardware collaborative offloading card 400 is a memory of the software-hardware collaborative offloading card 400, and storage space of the virtual machine is a memory of the virtual machine.

It should be further understood that the memory of the virtual machine is a part of a memory of the physical server 100. For ease of description, the following uses an example in which the memory of the virtual machine is the memory of the physical server 100 for description.

Step 810: The physical server 100 stores the IO request delivered by the virtual machine into the memory of the physical server 100.

The virtual machine on the physical server 100 delivers the IO request, and a physical CPU running on the virtual machine stores the IO request into the memory of the physical server 100.

Specifically, the physical server 100 may scan, through a link between an RC chip and an EP chip, an IO interface that is of the software-hardware collaborative offloading card 400 and that is stored in a register in the EP chip, and obtain an IO protocol corresponding to the IO interface. The physical server 100 may record a correspondence between the virtual machine running on the physical server 100 and the IO interface of the software-hardware collaborative offloading card 400. If the virtual machine that delivers the IO request needs to send the IO request to an IO interface 1 for processing, and an IO protocol corresponding to the IO interface 1 is a VirtIO protocol, the virtual machine may send the IO request to a drive corresponding to the VirtIO protocol. The drive may determine a data structure of the IO request in the memory of the physical server 100 according to the VirtIO protocol. For example, the data structure of the IO request in the memory of the physical server 100 is an IO ring (IO ring). The IO ring is of a data structure including an available queue (available queue) and a used queue (used queue). The available queue (available queue) is used to store an IO request, and the used queue (used queue) is used to store an IO response corresponding to the IO request.

Step 820: An external device connected to the physical server 100 synchronizes queue information in the memory of the physical server 100 to a memory of the external device.

Optionally, the software-hardware collaborative offloading card 400, serving as the external device connected to the physical server 100, may further receive a second configuration information. The second configuration information is used to indicate whether the software-hardware collaborative offloading card 400 synchronizes the queue information in the memory of the physical server 100 to the memory of the software-hardware collaborative offloading card 400 in a polling manner or an interrupt manner.

For example, the software-hardware collaborative offloading card 400 may synchronize the queue information in the memory of the virtual machine physical server 100 to the memory of the software-hardware collaborative offloading card 400 in the polling manner. For the IO interface 1 of the software-hardware collaborative offloading card 400, the software-hardware collaborative offloading card 400 may determine, based on the IO protocol corresponding to the IO interface 1, a size of the IO request stored in the memory of the virtual machine physical server 100. A CPU of the software-hardware collaborative offloading card 400 may obtain the queue information in the memory of the virtual machine physical server 100 by performing a write operation on the register in the EP chip. Specifically, the CPU of the software-hardware collaborative offloading card 400 may invoke a DMA interface provided by a PCIe adapter module, to perform a write operation on the register in the EP chip. For example, the CPU of the software-hardware collaborative offloading card 400 writes, into the register in the EP chip, a back-end address and a front-end address required for synchronizing the queue information. For another example, a size of the queue information that needs to be synchronized is written into the register in the EP chip. The EP chip may send a PCIe message to the RC chip in the physical server 100 based on content written into the register in the EP chip, where the PCIe message includes the queue information that needs to be synchronized by the software-hardware collaborative offloading card 400. After receiving the PCIe message sent by the EP chip, the RC chip obtains the queue information from the memory of the physical server 100 through a bus, and sends the queue information to the EP chip through the link between the RC chip and the EP chip. The EP chip may store the received queue information into the memory of the software-hardware collaborative offloading card 400 through the bus.

It should be noted that, in the foregoing polling process, after synchronizing the queue information in the memory of the physical server 100 to the memory of the external device, the software-hardware collaborative offloading card 400 may further invoke an IO protocol processing module corresponding to the IO protocol of the IO interface 1 to read the synchronized queue information from the memory of the software-hardware collaborative offloading card 400, and determine whether there is a to-be-processed IO request.

For example, the software-hardware collaborative offloading card 400 may synchronize the queue information in the memory of the physical server 100 to the memory of the software-hardware collaborative offloading card 400 in the interrupt manner. After the RC chip in the physical server 100 determines that a to-be-processed IO request is stored in the memory of the physical server 100, the RC chip may send a PCIe message to the EP chip through the link between the RC chip and the EP chip. The PCIe message is used to indicate the EP chip to wake up the CPU of the software-hardware collaborative offloading card 400. The EP chip may send an interrupt request to the CPU of the software-hardware collaborative offloading card 400 based on the PCIe message sent by the RC chip, where the interrupt request is used to indicate the CPU of the software-hardware collaborative offloading card 400 to synchronize the queue information in the memory of the physical server 100. After receiving the interrupt request, the CPU of the software-hardware collaborative offloading card 400 obtains the queue information in the memory of the physical server 100 by performing a write operation on the register in the EP chip. A specific process is similar to the process in the foregoing polling manner. For details, refer to the specific implementation in which the CPU of the software-hardware collaborative offloading card 400 obtains the queue information in the memory of the physical server 100 by performing a write operation on the register in the EP chip. Details are not described herein again.

Using the polling manner can reduce a notification delay between the front-end physical server 100 and the back-end software-hardware collaborative offloading card 400. Using the interrupt manner can reduce a quantity of PCIe messages on the PCIe link between the RC chip and the EP chip can be reduced.

In the foregoing technical solution, an overall replication method may be used to ensure that all to-be-processed IO requests can be obtained by performing a DMA operation once. This can improve IO processing performance in a scenario in which there are a large quantity of IO requests.

Step 830: The external device connected to the physical server 100 forwards the IO request to a storage server or a network server connected to the physical server 100 through a network interface card for IO processing.

The software-hardware collaborative offloading card 400, serving as the external device connected to the physical server 100, may read a synchronized IO request from the memory of the software-hardware collaborative offloading card 400, and may select, based on content in the IO request, to send the IO request to the storage server or the network server through the network interface card for IO processing. Specifically, the IO protocol of the IO interface 1 is the VirtIO protocol; and the CPU of the software-hardware collaborative offloading card 400 may invoke a VirtIO protocol processing module to read the synchronized IO request from the memory of the software-hardware collaborative offloading card 400, and parse the IO request. The CPU of the software-hardware collaborative offloading card 400 determines, based on content in the IO request, to send the IO request to the storage server or the network server through the network interface card for IO processing.

Step 840: The external device connected to the physical server 100 obtains an IO response corresponding to the IO request.

After the to-be-processed IO request has been processed by a storage resource or a network resource, the IO response corresponding to the IO request may be generated. The software-hardware collaborative offloading card 400, serving as the external device connected to the physical server 100, obtains the IO response in a plurality of specific implementations. This is not specifically limited in this embodiment of this application.

For example, the CPU of the software-hardware collaborative offloading card 400 may determine, in the polling manner, whether the storage resource or the network resource has processed the to-be-processed IO request. Specifically, the CPU of the software-hardware collaborative offloading card 400 may send, through the network interface card, a query packet to the storage server or the network server connected to the software-hardware collaborative offloading card 400. The query packet is used to query, from the storage server or the network server, whether there is the IO response corresponding to the IO request. If the storage server or the network server has processed the to-be-processed IO request, the storage server or the network server may send, to the CPU of the software-hardware collaborative offloading card 400 through the network interface card, a message indicating that the IO request has been processed. After receiving the message, the CPU of the software-hardware collaborative offloading card 400 may obtain, from the storage server or the network server connected to the software-hardware collaborative offloading card 400, the IO response through the network interface card.

For another example, the CPU of the software-hardware collaborative offloading card 400 may obtain, in the interrupt manner, the IO response corresponding to the IO request. If the storage server or the network server has processed the to-be-processed IO request, the storage server or the network server may send the IO response to the software-hardware collaborative offloading card 400 through the network interface card. The network interface card may store the IO response in the memory of the software-hardware collaborative offloading card 400 through the bus, and send an interrupt request to the CPU of the software-hardware collaborative offloading card 400. The interrupt request indicates the CPU of the software-hardware collaborative offloading card 400 to synchronize the IO response stored in the memory to the memory of the physical server 100.

Step 850: The external device connected to the physical server 100 synchronizes the IO response to the memory of the physical server 100.

The CPU of the software-hardware collaborative offloading card 400 may synchronize the IO response in the memory of the physical server 100 by performing a write operation on the register in the EP chip. Specifically, the CPU of the software-hardware collaborative offloading card 400 may invoke the DMA interface provided by the PCIe adapter module, to perform a write operation on the register in the EP chip. For example, the CPU of the software-hardware collaborative offloading card 400 writes, into the register in the EP chip, related information of the IO response that needs to be synchronized to the memory of the physical server 100. The EP chip may send a PCIe message to the RC chip in the physical server 100 based on content written into the register in the EP chip, where the PCIe message includes the IO response stored by the EP chip in the memory of the software-hardware collaborative offloading card 400. After receiving the PCIe message sent by the EP chip, the RC chip stores, through the bus, the IO response carried in the PCIe message into the memory of the physical server 100.

In this embodiment of this application, an execution thread for processing the IO response may be the same as an execution thread for processing the IO request, that is, the IO response may also be processed by the execution thread to which the IO request belongs. When an IO request and an IO response are delivered concurrently, this can avoid performing a lock operation on respective threads to which the IO request and the IO response belong, reduce CPU overheads, and improve throughput performance.

Step 860: The external device notifies the physical server 100 that the IO request delivered by the virtual machine has been processed.

After the software-hardware collaborative offloading card 400, serving as the external device connected to the physical server 100, synchronizes the IO response to the memory of the physical server 100, the CPU of the software-hardware collaborative offloading card 400 may send, to the CPU of the physical server 100 by using the EP chip, a notification indicating that the IO request has been processed. Specifically, the CPU of the software-hardware collaborative offloading card 400 may invoke an interrupt sending interface provided by the PCIe adapter module, to perform a write operation on the register in the EP chip. For example, the CPU of the software-hardware collaborative offloading card 400 writes, into the register in the EP chip, related information indicating that the IO request has been processed. The EP chip may send a PCIe message to the RC chip in the physical server 100 based on content written into the register in the EP chip, where the PCIe message is used to notify the software-hardware collaborative offloading card 400 that the IO request has been processed. After receiving the PCIe message sent by the EP chip, the RC chip sends an interrupt request to the CPU of the physical server 100, where the interrupt request is used to indicate that the IO request has been completed. After receiving the interrupt request, the CPU of the physical server 100 notifies the virtual machine that the IO request has been processed. After the virtual machine fetches the IO response from the memory of the physical server 100, the virtual machine notifies an application on the virtual machine of an IO processing result.

Optionally, in some embodiments, when a plurality of IO requests are concurrently processed, the CPU of the software-hardware collaborative offloading card 400 may notify, after a plurality of IO responses are synchronized to the used queue (used queue) of the memory of the physical server 100, the physical server 100 that the IO request has been processed.

In the foregoing technical solution, an interrupt notification may be triggered after the plurality of IO responses are placed into a front-end communication queue, so as to avoid relatively high signaling overheads caused by triggering an IO request processing completion notification each time an IO response is placed.

Optionally, in some embodiments, another IO protocol may be used as an extended protocol processing module to access an upper-layer protocol processing module, for protocol extension. In a process of adding another IO protocol processing module or upgrading existing software, in this embodiment of this application, a user of the virtual machine may be unaware of IO interruption, thereby implementing no service interruption in the software upgrade process. The following provides detailed description with reference to FIG. 9.

Figure 9:
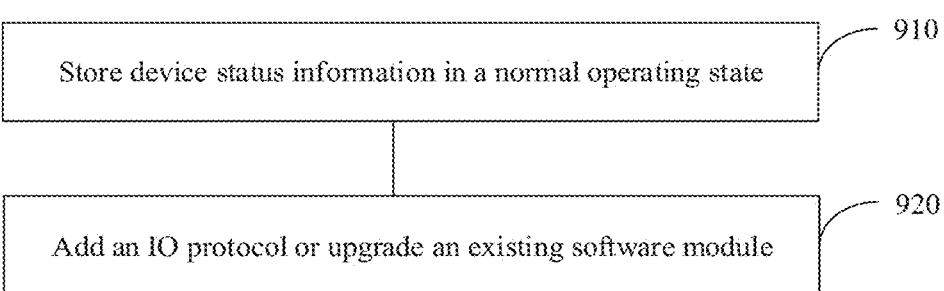
FIG. 9 is a schematic flowchart of another IO request processing method according to an embodiment of this application.

Refer to FIG. 9. A method for implementing software upgrade or IO protocol extension may include steps 910 and 920. The following separately describes steps 910 and 920 in detail.

Step 910: Store device status information in a normal operating state.

In a normal process of using a software-hardware collaborative offloading card 400, an IO protocol is added or an existing software module is upgraded. When the software-hardware collaborative offloading card 400 is in the normal operating state, a CPU of the software-hardware collaborative offloading card 400 creates memory space in a memory to store all status information. The status information may include an IO count processed by each IO interface and queue information.

Step 920: Add an IO protocol or upgrade an existing software module.

When a protocol module needs to be added or software needs to be upgraded, the CPU of the software-hardware collaborative offloading card 400 suspends processing of an IO request, and verifies the IO count recorded in the device status information.

If the IO count is not zero, it indicates that there is still an IO request to be processed in a storage resource or a network resource. In this case, after processing of the IO request is completed, the CPU of the software-hardware collaborative offloading card 400 restarts an entire software system, and reloads a software module, to upgrade the existing software module or add the IO protocol. The CPU of the software-hardware collaborative offloading card 400 reads the queue information from the status information stored in the memory, and resumes IO processing of the software-hardware cooperative offloading card 400.

If the IO count is zero, it indicates that no IO request is being processed in the storage resource or the network resource. The CPU of the software-hardware collaborative offloading card 400 may directly restart the software system, and reload each software module, to upgrade the existing software module or add the IO protocol. The CPU of the software-hardware collaborative offloading card 400 reads the queue information from the status information stored in the memory, and resumes IO processing of the software-hardware cooperative offloading card 400.

In the foregoing technical solution, protocol update or upgrade can be implemented without interrupting an IO service of the virtual machine.

It may be understood that some or all of the steps in the foregoing embodiments may be performed. These steps or operations are merely examples. In this application, other operations or variants of operations may be further performed. In addition, the steps may be performed in a sequence different from that presented in the foregoing embodiments, and not all the operations in the foregoing embodiments are necessarily performed.

The foregoing describes in detail the IO request processing method provided in the embodiments of this application with reference to FIG. 1 to FIG. 9. The following describes in detail apparatus embodiments of this application with reference to FIG. 10 to FIG. 13. It should be understood that the descriptions of the method embodiments correspond to descriptions of the apparatus embodiments. Therefore, for parts that are not described in detail, refer to the descriptions in the foregoing method embodiments.

Figure 10:
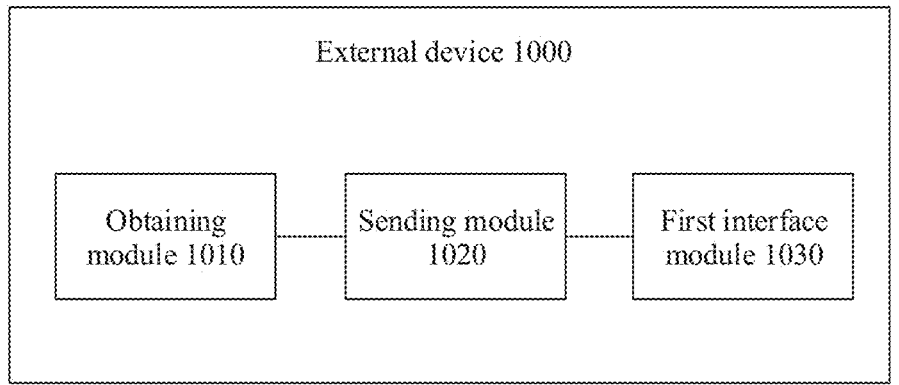
FIG. 10 is a schematic block diagram of an external device 1000 according to an embodiment of this application.

FIG. 10 is a schematic block diagram of an external device 1000 according to an embodiment of this application. The external device 1000 includes an obtaining module 1010, a sending module 1020, and a first interface module 1030.

The first interface module 1030 is adapted to communicate with a physical host, and the first interface module 1030 is an interface module that supports a high-speed serial computer extended bus standard PCIe protocol.

The obtaining module 1010 is adapted to synchronize, through the first interface module 1030, queue information in storage space of a virtual machine running on the physical host to storage space of the external device, where the queue information includes one or more input/output IO requests sent by the virtual machine.

The sending module 1020 is adapted to send the one or more IO requests to a storage server or a network server for processing.

In the foregoing technical solution, the physical host is connected to the external device, and the external device processes the IO request sent by the virtual machine running on the physical host. In this way, the IO request delivered by the virtual machine is directly transmitted to the external device of the physical host for processing, so that physical computing resource consumption resulting from IO virtualization for the physical host can be avoided, and all hardware resources of the physical host are used to provide virtual machine services for users. This improves utilization of the hardware resources of the physical host.

Optionally, the external device 1000 further includes a first receiving module 1040, adapted to receive a configuration message, where the configuration message is used to indicate to configure a protocol type of a first IO interface of the external device to a first IO protocol. A plurality of first IO interfaces are run on the first interface module. The first IO interface is a virtual interface of the first interface module, and the first IO interface corresponds to the virtual machine and is adapted to process the one or more IO requests sent by the virtual machine to the first IO interface. A data type and/or a data size of the one or more IO requests in the storage space of the virtual machine are associated with the first IO protocol.

The external device 1000 further includes a configuration module 1050, adapted to configure the protocol type of the first IO interface to the first IO protocol based on the configuration message.

Optionally, the first interface module 1030 is further adapted to receive a PCIe message sent by the physical host, where the PCIe message is used to indicate the external device that there is a to-be-processed IO request, and send an interrupt request to the processor in the external device based on the PCIe message.

The obtaining module 1010 is specifically adapted to synchronize, through the first interface module, the queue information in the storage space of the virtual machine to the storage space of the external device based on the interrupt request.

Optionally, the obtaining module 1010 is specifically adapted to indicate, by using a direct memory access DMA technology, the first interface module to synchronize the queue information in the storage space of the virtual machine to the storage space of the external device.

Optionally, the external device 1000 further includes: a first storage module 1060, adapted to store a quantity of IO requests processed by the first IO interface, and a loading module 1070, adapted to reload the first IO protocol when the quantity of IO requests is 0.

Optionally, the obtaining module 1010 is further adapted to obtain, from the storage server or the network server, an IO response corresponding to the IO request.

The external device 1000 further includes a second storage module 1080, adapted to store the IO response into the storage space of the virtual machine through the first interface module.

Optionally, the second storage module 1080 is specifically adapted to indicate, by using the DMA technology, the first interface module to store the IO response into the storage space of the virtual machine.

Optionally, the first storage module 1060 is further adapted to store IO responses corresponding to the plurality of IO requests into the storage space of the virtual machine.

The first interface module 1030 is further adapted to send a notification message to the physical host, where the notification message is used to notify the physical host that the plurality of IO requests have been processed.

Figure 11:
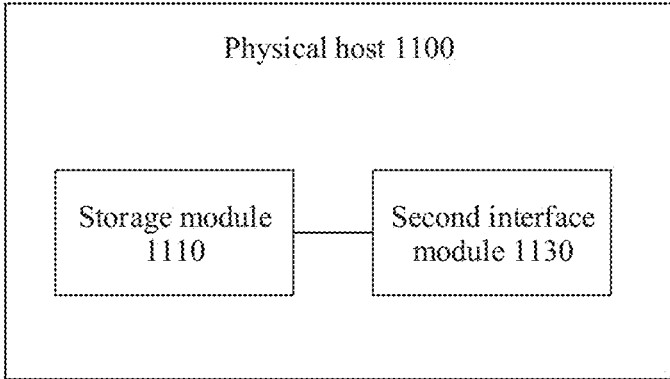
FIG. 11 is a schematic block diagram of a physical host 1100 according to an embodiment of this application.

FIG. 11 is a schematic block diagram of a physical host 1100 according to an embodiment of this application. The physical host 1100 includes a storage module 1110 and a second interface module 1130.

The second interface module 1130 is an interface that supports a high-speed serial computer extended bus standard PCIe protocol, and is adapted to communicate with an external device.

The storage module 1110 is adapted to store, into storage space of the virtual machine, one or more input/output IO requests delivered by a virtual machine running on the physical host 1100.

The second interface module 1130 is adapted to synchronize the one or more IO requests in the storage space of the virtual machine to storage space of the external device.

Optionally, the second interface module 1130 is further adapted to send a PCIe message to the external device, where the PCIe message is used to indicate the external device that there is a to-be-processed IO request.

Optionally, the second interface module 1130 is further adapted to receive an IO response sent by the external device, where the IO response corresponds to the IO request, and the IO response is obtained by the external device from a storage server or a network server.

Optionally, the second interface module 1130 is further adapted to receive, through the second interface module, a notification message sent by the external device, where the notification message is used to notify the physical host 1100 that the plurality of IO requests have been processed.

Figure 12:
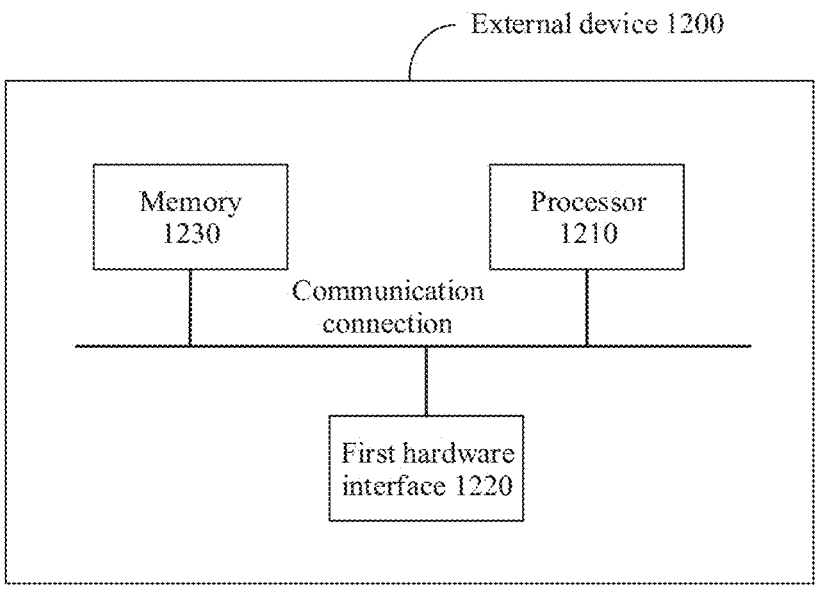
FIG. 12 is a schematic block diagram of an external device 1200 according to an embodiment of this application.

FIG. 12 is a schematic block diagram of an external device 1200 according to an embodiment of this application. The external device 1200 may include a processor 1210, a first hardware interface 1220, and a memory 1230.

The processor 1210, the first hardware interface 1220, and the memory 1230 are connected through an internal connection path. The memory 1230 is adapted to store a program instruction, and the processor 1210 is adapted to invoke and run the computer program instruction from the memory 1230 to perform the following operations:

synchronizing, through the first hardware interface 1220, queue information in storage space of a virtual machine running on the physical host to storage space of the external device, where the queue information includes one or more input/output IO requests sent by the virtual machine; and sending the one or more IO requests to a storage server or a network server for processing.

It should be understood that, the processor 1210 in this embodiment of this application may be a central processing unit (central processing unit, CPU), or may be another general-purpose processor, a digital signal processor (digital signal processor, DSP), an application specific integrated circuit (application specific integrated circuit, ASIC), a field programmable gate array (field programmable gate array, FPGA) or another programmable logic device, a discrete gate or transistor logic device, a discrete hardware component, or the like. The general-purpose processor may be a microprocessor, or the processor may be any conventional processor or the like. Alternatively, the processor 1210 may be one or more integrated circuits, and is adapted to execute a related program, to implement the technical solutions provided in this embodiment of this application.

The memory 1230 may include a read-only memory and a random access memory, and provide instructions and data for the processor 1210. A part of the processor 1210 may further include a non-volatile random access memory. For example, the processor 1210 may further store device type information.

Optionally, the processor 1210 is further adapted to: receive a configuration message, where the configuration message is used to indicate to configure a protocol type of a first IO interface of the external device 1200 to a first IO protocol, a plurality of first IO interfaces are run on the first hardware interface 1220, the first IO interface is a virtual interface of the first hardware interface 1220, the first IO interface corresponds to the virtual machine and is adapted to process the one or more IO requests sent by the virtual machine to the first IO interface, and a data type and/or a data size of the one or more IO requests in the storage space of the virtual machine are associated with the first IO protocol; and configure the protocol type of the first IO interface to the first IO protocol based on the configuration message.

Optionally, the first hardware interface 1220 is further adapted to receive a PCIe message sent by the physical host, where the PCIe message is used to indicate the external device 1200 that there is a to-be-processed IO request, and send an interrupt request to the processor.

The processor 1210 is further adapted to synchronize, through the first hardware interface 1220, the queue information in the storage space of the virtual machine to the storage space of the external device 1200 based on the interrupt request.

Optionally, the processor 1210 is specifically adapted to indicate, by using a direct memory access DMA technology, the first hardware interface 1220 to synchronize the queue information in the storage space of the virtual machine to the storage space of the external device 1200.

Optionally, the processor 1210 is further adapted to store a quantity of IO requests processed by the first IO interface, and reload the first IO protocol when the quantity of IO requests is 0.

Optionally, the processor 1210 is further adapted to obtain, from the storage server or the network server, an IO response corresponding to the IO request, and store the IO response into the storage space of the virtual machine through the first hardware interface 1220.

Optionally, the processor 1210 is specifically adapted to indicate, by using the DMA technology, the first hardware interface 1220 to store the IO response into the storage space of the virtual machine.

Optionally, the processor 1210 is further adapted to store, through the first hardware interface 1220, IO responses corresponding to the plurality of IO requests into the storage space of the virtual machine, and send a notification message to the physical host through the first hardware interface 1220, where the notification message is used to notify the physical host that the plurality of IO requests have been processed.

In the implementation process, each step of the foregoing method may be completed by using an integrated logical circuit of hardware in the processor 1210 or instructions in a form of software. The methods disclosed with reference to the embodiments of this application may be directly performed by a hardware processor, or may be performed by using a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory 1230, and the processor 1210 reads information from the memory 1230 and completes the steps in the foregoing methods in combination with the hardware of the processor 1210.

It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

Figure 13:
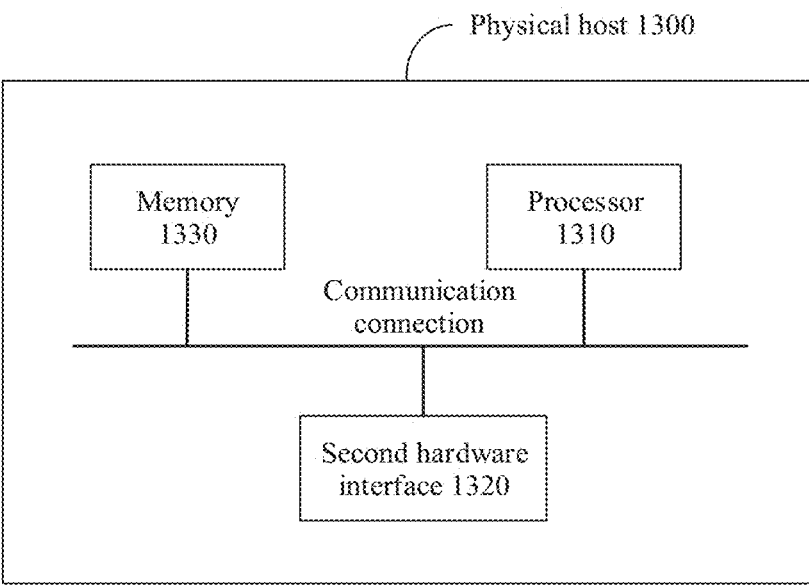
FIG. 13 is a schematic block diagram of a physical host 1300 according to an embodiment of this application.

FIG. 13 is a schematic block diagram of a physical host 1300 according to an embodiment of this application. The physical host 1300 may include a processor 1310, a second hardware interface 1320, and a memory 1330.

The processor 1310, the second hardware interface 1320, and the memory 1330 are connected through an internal connection path. The memory 1330 is adapted to store a program instruction, and the processor 1310 is adapted to invoke and run the computer program instruction from the memory 1330 to perform the following operation:

storing, into storage space of the virtual machine, one or more input/output IO requests delivered by a virtual machine running on the physical host 1300.

The second hardware interface 1320 is adapted to synchronize the one or more IO requests in the storage space of the virtual machine to storage space of the external device.

It should be understood that, the processor 1310 in this embodiment of this application may be a central processing unit (central processing unit, CPU), or may be another general-purpose processor, a digital signal processor (digital signal processor, DSP), an application specific integrated circuit (application specific integrated circuit, ASIC), a field programmable gate array (field programmable gate array, FPGA) or another programmable logic device, a discrete gate or transistor logic device, a discrete hardware component, or the like. The general-purpose processor may be a microprocessor, or the processor may be any conventional processor or the like. Alternatively, the processor 1310 may be one or more integrated circuits, and is adapted to execute a related program, to implement the technical solutions provided in this embodiment of this application.

The memory 1330 may include a read-only memory and a random access memory, and provide instructions and data for the processor 1310. A part of the processor 1310 may further include a non-volatile random access memory. For example, the processor 1310 may further store device type information.

Optionally, the second hardware interface 1320 is further adapted to send a PCIe message to the external device, where the PCIe message is used to indicate the external device that there is a to-be-processed IO request.

Optionally, the second hardware interface 1320 is further adapted to receive an IO response sent by the external device, where the IO response corresponds to the IO request, and the IO response is obtained by the external device from a storage server or a network server.

Optionally, the second hardware interface 1320 is further adapted to receive a notification message sent by the external device, where the notification message is used to notify the physical host that the plurality of IO requests have been processed.

In the implementation process, each step of the foregoing method may be completed by using an integrated logical circuit of hardware in the processor 1310 or instructions in a form of software. The methods disclosed with reference to the embodiments of this application may be directly performed by a hardware processor, or may be performed by using a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory 1330, and the processor 1310 reads information from the memory 1330 and completes the steps in the foregoing methods in combination with the hardware of the processor.

It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps can be implemented by electronic hardware or a combination of computer software and electronic hardware. Whether the functions are performed by the hardware or the software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The storage medium includes any medium that can store program code, such as a USB flash drive, a removable hard disk drive, a read-only memory (read-only memory, ROM), a random access memory (random access memory, RAM), a magnetic disk, or an optical disc.

The foregoing descriptions are merely specific implementations of this application, but the protection scope of this application is not limited thereto. Any variation or replacement that can be readily figured out by the person skilled in the art within the technical scope disclosed in this application shall fall within the protection scope of this application. Therefore, the protection scope of this application shall be subject to the protection scope of the claims.

What is claimed is:

1. A method for input/output (IO) request processing, wherein the method is used in an external device, the external device comprises at least one processor and a first hardware interface, the first hardware interface supports a high-speed serial computer extended bus standard peripheral component interconnect express (PCIe) protocol, the external device communicates with a physical host through the first hardware interface, and the method comprises:

receiving, by the at least one processor, a configuration message, wherein the configuration message is used to indicate to configure a protocol type of a first IO interface of the external device to a first IO protocol, the first IO interface is run on the first hardware interface, the first IO interface is a virtual interface of the first hardware interface, the first IO interface corresponds to a virtual machine and is adapted to process one or more IO requests sent by the virtual machine to the first IO interface, and at least one of a data type or a data size of at least one IO request in a storage space of the virtual machine is associated with the first IO protocol; and configuring, by the at least one processor, the protocol type of the first IO interface to the first IO protocol based on the configuration message;

synchronizing, by the at least one processor through the first hardware interface, queue information in the storage space of the virtual machine running on the physical host to storage space of the external device, wherein the queue information comprises the one or more IO requests sent by the virtual machine; and sending, by the at least one processor, the one or more IO requests to a storage server or a network server for processing.

2. The method according to claim 1, wherein the synchronizing comprises determining, based on the first IO protocol corresponding to the first IO interface, a data size of one of the at least one IO request in the storage space of the virtual machine.

3. The method according to claim 1, wherein before the synchronizing, by the at least one processor through the first hardware interface, queue information in the storage space of the virtual machine running on the physical host to storage space of the external device, the method further comprises:

receiving, by the first hardware interface, a PCIe message sent by the physical host, wherein the PCIe message is used to indicate to the external device that there is a to-be-processed IO request; and sending, by the first hardware interface, an interrupt request to the at least one processor;

wherein the synchronizing includes synchronizing, by the at least one processor through the first hardware interface, the queue information in the storage space of the virtual machine to the storage space of the external device based on the interrupt request.

4. The method according to claim 1, wherein the synchronizing, by the at least one processor through the first hardware interface, queue information in the storage space of the virtual machine running on the physical host to storage space of the external device comprises:

indicating, by the at least one processor by using a direct memory access (DMA) technology, the first hardware interface to synchronize the queue information in the storage space of the virtual machine to the storage space of the external device.

5. The method according to claim 1, wherein the method further comprises:

after the synchronizing, invoking an IO protocol processing module corresponding to the first IO protocol of the IO interface to read synchronized queue information from the storage space of the external device; and determining whether there is a to-be-processed IO request.

6. The method according to claim 1, wherein the method further comprises:

obtaining, from the storage server or the network server by the at least one processor, an IO response corresponding to one of the one or more IO requests; and storing, by the at least one processor, the IO response into the storage space of the virtual machine through the first hardware interface.

7. The method according to claim 6, wherein the storing, by the at least one processor, the IO response into the storage space of the virtual machine through the first hardware interface comprises:

indicating, by the at least one processor by using a direct memory access (DMA) technology, the first hardware interface to store the IO response into the storage space of the virtual machine.

8. The method according to claim 6, wherein the method further comprises:

storing, by the at least one processor through the first hardware interface, IO responses corresponding to a plurality of the one or more IO requests into the storage space of the virtual machine, and sending a notification message to the physical host through the first hardware interface, wherein the notification message is used to notify the physical host that the plurality of the one or more IO requests have been processed.

9. An external device, wherein the external device comprises at least one processor, a receiver, a transmitter, and a first hardware interface, wherein:

the receiver is adapted to receive a configuration message, wherein the configuration message is used to indicate to configure a protocol type of a first input/output (IO) interface of the external device to a first IO protocol, the first IO interface is run on the first hardware interface, the first IO interface is a virtual interface of the first hardware interface, the first IO interface corresponds to a virtual machine and is adapted to process one or more IO requests sent by the virtual machine to the first IO interface, and at least one of a data type or a data size of at least one IO request in a storage space of the virtual machine is associated with the first IO protocol; and the at least one processor is adapted to configure the protocol type of the first IO interface to the first IO protocol based on the configuration message;

the first hardware interface is adapted to communicate with a physical host, and the first hardware interface supports a high-speed serial computer extended bus standard peripheral component interconnect express (PCIe) protocol;

the at least one processor is adapted to synchronize, through the first hardware interface, queue information in the storage space of the virtual machine running on the physical host to storage space of the external device, wherein the queue information comprises the one or more IO requests sent by the virtual machine; and the transmitter is adapted to send the one or more IO requests to a storage server or a network server for processing.

10. The external device according to claim 9, wherein the first hardware interface is further adapted to:

receive a PCIe message sent by the physical host, wherein the PCIe message is used to indicate to the external device that there is a to-be-processed IO request; and send an interrupt request to the at least one processor in the external device based on the PCIe message; and the receiver is adapted to:

synchronize, through the first hardware interface, the queue information in the storage space of the virtual machine to the storage space of the external device based on the interrupt request.

11. The external device according to claim 9, wherein the receiver is adapted to:

indicate, by using a direct memory access (DMA) technology, the first hardware interface to synchronize the queue information in the storage space of the virtual machine to the storage space of the external device.

12. An external device, comprising: at least one processor, a first hardware interface, and at least one memory, wherein the at least one memory is coupled to the at least one processor and stores instructions that, when executed by the at least one processor, cause the at least one processor to perform operations comprising:

receiving, by the at least one processor, a configuration message, wherein the configuration message is used to indicate to configure a protocol type of a first input/output (IO) interface of the external device to a first IO protocol, the first IO interface is run on the first hardware interface, the first IO interface is a virtual interface of the first hardware interface, the first IO interface corresponds to a virtual machine and is adapted to process one or more IO requests sent by the virtual machine to the first IO interface, and at least one of a data type or a data size of at least one IO request in a storage space of the virtual machine is associated with the first IO protocol; and configuring, by the at least one processor, the protocol type of the first IO interface to the first IO protocol based on the configuration message;

synchronizing, through the first hardware interface, queue information in the storage space of the virtual machine running on a physical host to storage space of the external device, wherein the queue information comprises the one or more IO requests sent by the virtual machine; and sending the one or more IO requests to a storage server or a network server for processing.

13. The external device according to claim 12, wherein the synchronizing comprises determining, based on the first IO protocol corresponding to the first IO interface, a data size of one of the at least one IO request in the storage space of the virtual machine.

14. The external device according to claim 12, wherein before the synchronizing, the operations further comprise:

receiving a PCIe message sent by the physical host, wherein the PCIe message is used to indicate to the external device that there is a to-be-processed IO request; and sending an interrupt request to the at least one processor; and synchronizing, through the first hardware interface, the queue information in the storage space of the virtual machine to the storage space of the external device based on the interrupt request.

15. The external device according to claim 12, wherein the synchronizing comprises:

indicating, by using a direct memory access (DMA) technology, the first hardware interface to synchronize the queue information in the storage space of the virtual machine to the storage space of the external device.

16. The external device according to claim 12, wherein the operations comprise:

obtaining, from the storage server or the network server by the at least one processor, an IO response corresponding to one of the one or more IO requests; and storing the IO response into the storage space of the virtual machine through the first hardware interface.

17. The external device according to claim 16, wherein the storing the IO response into the storage space of the virtual machine through the first hardware interface comprises:

indicating, by using a direct memory access (DMA) technology, the first hardware interface to store the IO response into the storage space of the virtual machine.

18. The external device according to claim 16, wherein the operations comprise:

storing, through the first hardware interface, IO responses corresponding to a plurality of the one or more IO requests into the storage space of the virtual machine, and sending a notification message to the physical host through the first hardware interface, wherein the notification message is used to notify the physical host that the plurality of the one or more IO requests have been processed.

19. The external device according to claim 12, wherein the operations comprise:

after the synchronizing, invoking an IO protocol processing module corresponding to the first IO protocol of the IO interface to read synchronized queue information from the storage space of the external device; and determining whether there is a to-be-processed IO request.

20. The external device according to claim 12, wherein the first hardware interface is an end point (EP) chip, and the operations comprise:

synchronizing a mapping relationship between the first IO interface and a corresponding IO protocol to a register in the EP chip.

* * * * *